US012342824B2

(12) United States Patent
Lyn et al.

(10) Patent No.: US 12,342,824 B2
(45) Date of Patent: Jul. 1, 2025

(54) METAL-INFUSED ANTIMICROBIAL MATERIAL AND METHOD OF PREPARATION THEREOF

(71) Applicant: Microbonds Inc., Markham (CA)

(72) Inventors: Robert Lyn, Markham (CA); John Persic, Toronto (CA)

(73) Assignee: APEX BIOMATERIALS INC., Markham (CA)

( * ) Notice: Subject to any disclaimer, the term of this patent is extended or adjusted under 35 U.S.C. 154(b) by 0 days.

(21) Appl. No.: 17/510,554

(22) Filed: Oct. 26, 2021

(65) Prior Publication Data

US 2022/0110327 A1 Apr. 14, 2022

Related U.S. Application Data

(63) Continuation-in-part of application No. 16/910,457, filed on Jun. 24, 2020.

(60) Provisional application No. 63/016,803, filed on Apr. 28, 2020.

(51) Int. Cl.
*A01N 59/16* (2006.01)
(52) U.S. Cl.
CPC .................................. *A01N 59/16* (2013.01)
(58) Field of Classification Search
CPC ........ A01N 25/08; A01N 25/34; A01N 59/16; A01N 59/20; A01N 59/10
See application file for complete search history.

(56) References Cited

U.S. PATENT DOCUMENTS

| 2,630,444 | A | 3/1953 | Fugassi et al. |
| 3,058,948 | A | 10/1962 | Mosimann et al. |
| 5,585,407 | A | 12/1996 | Patel et al. |
| 2008/0057136 | A1 | 3/2008 | Polyakov et al. |
| 2011/0305826 | A1 | 12/2011 | Mokhtari et al. |
| 2013/0189499 | A1 | 7/2013 | Blanton et al. |
| 2015/0164085 | A1 | 6/2015 | Hall |

FOREIGN PATENT DOCUMENTS

| CA | 1190860 | A | 7/1985 |
| CA | 2547815 | A1 | 6/2005 |
| CA | 2877998 | C | 1/2014 |

OTHER PUBLICATIONS

M. Gouda and A. Hebeish, "Preparation and Evaluation of CuO/Chitosan Nanocomposite for Antibacterial Finishing Cotton Fabric", Journal of Industrial Textiles, 39(3), 2010, 203-214. (Year: 2010).*
Vida Allahyarzadeh, Majid Montazer, Nahid Hemmati Nejad, and Nasrin Samadi, "In Situ Synthesis of Nano Silver on Polyester Using NaOH/Nano TiO2", Journal of Applied Polymer Science, 129, 2013, 892-900. (Year: 2013).*
Ali Sedighi and Majid Montazer, "Tunable shaped N-doped CuO nanoparticles on cotton fabric through processing conditions: synthesis, Antibacterial behavior and mechanical properties", Cellulose (2016) 23:2229-2243. (Year: 2016).*
Azam Ali, Vijay Baheti and Jiri Militky, "Copper and Silver Coated Textiles for Smart Applications", 47th Textile Research Symposium, Jun. 17-19, 2019, 69-70. (Year: 2019).*
Dan Yu, Gengen Kang, Weicheng Tian, Lu Lin, and Wei Wang, "Preparation of conductive silk fabric with antibacterial properties by electroless silver plating", Applied Surface Science 357 (2015) 1157-1162 (Year: 2015).*
Amir Reza Abbasi, Nourolah Noori, Azadeh Azadbakht and Mohsen Bafarani, "Dense coating of surface mounted Cu2O nanoparticles upon silk fibers under ultrasound irradiation with antibacterial activity", Journal of Iranian Chemical Society (2016) 13: 1273-1281 (Year: 2016).*
Yanjuan Cao, Binjie Xin, Xiangji Wu and Weiping Du, "Research on Progress and Possibility of Electrospining of Native Cellulose and Preparation of copper-based antimicrobial fiber", Advanced Materials Research, 2014, vols. 850-851, pp. 53-56 (Year: 2014).*
Broome et al., Title: Complex formation with high molecular amines, American Chemical Society, vol. 68, Jan. 1946, pp. 67-69. (Year: 1946).
Sim et al., Title: Antimicrobial Silver in Medicinal and Consumer Applications: A Patent Review of the Past Decade (2007-2017); Antibiotics, 2018, vol. 7, Issue 97, pp. 2-15; Published: Oct. 26, 2018 (Year: 2018).
International Search Report and Written Opinion from PCT Application No. PCT/CA2021/050588 dated Aug. 9, 2021.

(Continued)

*Primary Examiner* — Mina Haghighatian
*Assistant Examiner* — Nathan W Schlientz
(74) *Attorney, Agent, or Firm* — Aird & McBurney LP

(57) ABSTRACT

In one aspect, there is provided a metal-infused, antimicrobial material comprising a base substrate including at least one organic compound with a functional group, a seed layer that is chemically bonded to the base substrate and has a chemical structure including an ion of an antimicrobial metal that is chemically bonded to the functional group via a coordinated covalent bond, and a bulk metal layer of a metal oxide or a metal hydroxide of the antimicrobial metal that is chemically bonded to the seed layer, where the bulk layer has a chemical structure including at least one molecule of the metal oxide or the metal hydroxide of the antimicrobial metal that is bonded to the ion of the antimicrobial metal in the seed layer via a metal-oxide ionic bond. In another aspect, there is provided a method for preparing a metal-infused, antimicrobial material as disclosed herein.

22 Claims, 13 Drawing Sheets

(56) References Cited

OTHER PUBLICATIONS

Office Action from corresponding U.S. Appl. No. 16/910,457 dated Feb. 12, 2021.
Final Office Action from corresponding U.S. Appl. No. 16/910,457 dated Jul. 2, 2021.
Eremenko et al., Title: Antibacterial and Antimycotic Activity of Cotton Fabrics, Impregnated With Silver and Binary Silver/Copper Nanoparticles; Nanoscale Research Letters (2016) 11:28; pp. 1-9.

* cited by examiner

METAL-INFUSED ANTIMICROBIAL MATERIAL AND METHOD OF PREPARATION THEREOF

CROSS-REFERENCE TO OTHER APPLICATIONS

This application is a continuation-in-part of and claims the benefit of U.S. application Ser. No. 16/910,457, filed on Jun. 24, 2020, which claims the benefit of U.S. Provisional Application Ser. No. 63/016,803, filed on Apr. 28, 2020, the entire contents of both of which are incorporated herein by reference.

FIELD OF THE INVENTION

The present invention relates generally to an antimicrobial material infused with metal.

BACKGROUND OF THE INVENTION

Microbes (i.e., bacteria, fungi, viruses & mold) cause a range of problems for humans, spanning simple problems such as odor, to skin disorders to STD to deadly diseases such as Ebola. Humans are generally in contact with and encounter forms of fabrics and textiles on a continuous and repeated daily basis. Therefore, it is advantageous to put antimicrobial agents into textiles. There are three known metal agents which produce long-lasting and durable antimicrobial properties: copper, silver and zinc. Silver and copper have approximately equal potency as an antimicrobial agent while the potency of zinc is comparatively weaker. In choosing between copper and silver, copper is the preferred element, as copper is an essential element used by the skin to support elastin and collagen health; whereas silver has no known use in the body or in any other living organism. As such, while copper is toxic to microorganisms, it is also absorbed as a beneficial and long-lasting mineral in the body and therefore is the preferred antimicrobial agent amongst copper, silver or zinc. The active ingredient in all cases is the metal ion, which can be presented in many forms: pure metal, metal salt, metal oxide, metal hydroxide, organometallic powder, etc.

The normal methods of infusing copper, silver or zinc into fabrics requires binding agents (typically polymers), either in the form of copper, silver or zinc particles or salts embedded into polymers which are then extruded into yarns and then the yarns are knitted into the fabrics. Alternatively, the metal particles may be mixed into a binding medium (e.g., polymer or zeolite) and then provided as a mixture of copper powders or metal nanoparticles dispersed into polymers or zeolites or other binder materials which allow the metal to be adhered to the target substrate to create the antimicrobial metal-infused textile.

However, it is found that due to current technologies and fabrication methods, commercial metal-infused textiles are lacking and cannot simultaneously address all of the necessary features required in a high-quality product, including where the fabric: has 100% coverage of fibers and sub-fibers with metal chemical, has little or no change in look or feel of the infused fabric, has long-lasting durability after washing and had has non-toxic properties in relation to human skin contact and other routes of entry (e.g., breathing in).

Upon surveying other prior-art metal-based antimicrobial infusion techniques, it can be readily understood why this is the case. Prior art antimicrobial processes contain binding agents, such as ceramic zeolites or polymers to allow the metal to adhere to the textile/fabric fibers—however, this limits how deeply and uniformly the metal can infuse into the fibers and also changes the feel, or "hand" of the product when the extra binder/polymer material is added.

Any type of spray metallization techniques (e.g., vapor deposition or cold spray) which used to produce metal-infused fabrics are "line-of-sight", in that they do not infuse fully around and throughout the complex weave of fibers and sub-fibers in a textile.

Any type of galvanic plating techniques used to produce metal-infused are corrosive and highly toxic, thereby limiting them to a small subset of fabric materials (e.g., synthetic polymers such as nylon). In addition, galvanic plated substrates require a non-antimicrobial metal 'seed' layer as a catalyst for further plating, such as palladium, prior to plating the antimicrobial metal. Also, galvanic plating techniques leave behind toxic salts (e.g., cyanide) which must be carefully washed out of the final product.

It is therefore an object of the invention to provide an antimicrobial substrate which provides all of the benefits to meet the criteria mentioned above (e.g., antimicrobial efficacy, wash durability, color uniformity and good hand/feel), without the drawbacks encountered by existing metal-infused substrates.

SUMMARY OF THE INVENTION

According to an aspect, there is provided a metal-infused, antimicrobial material, comprising:

a base substrate having a surface including a base substrate material selected from a group of materials consisting of a fabric, a textile, a foam, and a paper, the base substrate material including at least one organic compound that has a functional group, a seed layer being chemically bonded to the base substrate and having a chemical structure including an ion of an antimicrobial metal that is chemically bonded to the functional group of the organic compound of the base substrate material via a coordinated covalent bond; and, a bulk metal layer of a metal oxide or a metal hydroxide of the antimicrobial metal being chemically bonded to the seed layer and having a chemical structure including at least one molecule of the metal oxide or the metal hydroxide of the antimicrobial metal that is bonded to the ion of the antimicrobial metal in the seed layer via a metal-oxide ionic bond.

In another aspect, there is provided a method for preparing a metal-infused, antimicrobial material, the method comprising:

a) providing a base substrate having a surface including a base substrate material selected from a group of materials consisting of a fabric, a textile, a foam, and a paper, the base substrate material including at least one organic compound that has a functional group;

b) contacting the base substrate with a solution including a solvent and an excess of an initial metal complex of the form $Me_x(X_{n+1}Y_m)[Z]$ to generate a ligand exchange reaction, wherein Me is an ion of an antimicrobial material, X and Y are neutral ligand exchange components and Z is an anionic ligand component, and wherein the ligand exchange reaction includes: removing one of the neutral ligand exchange components X from the initial metal complex to form a metal coordinate complex of the form $Me_x(X_nY_m)[Z]$, and, bonding the metal coordinate complex to the functional group of the at least one organic compound of the base substrate material via a coordinated covalent bond so as to form a seed layer; and c) evaporating the solvent to drive a decomposition reaction of the ligand exchange components X and Y from the metal coordinate complex of the form $Me_x(X_nY_m)[Z]$ in the seed layer and from the metal coordinate complex of the form $Me_x(X_{n+1}Y_m)[Z]$ in the solution, the decomposition reaction forming a bulk metal layer of a metal oxide or metal hydroxide of the antimicrobial metal, the chemical structure of the bulk metal layer including at least one molecule of the metal oxide or the metal hydroxide of the antimicrobial metal bonded to the ion of the antimicrobial metal in the seed layer via a metal-oxide ionic bond.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
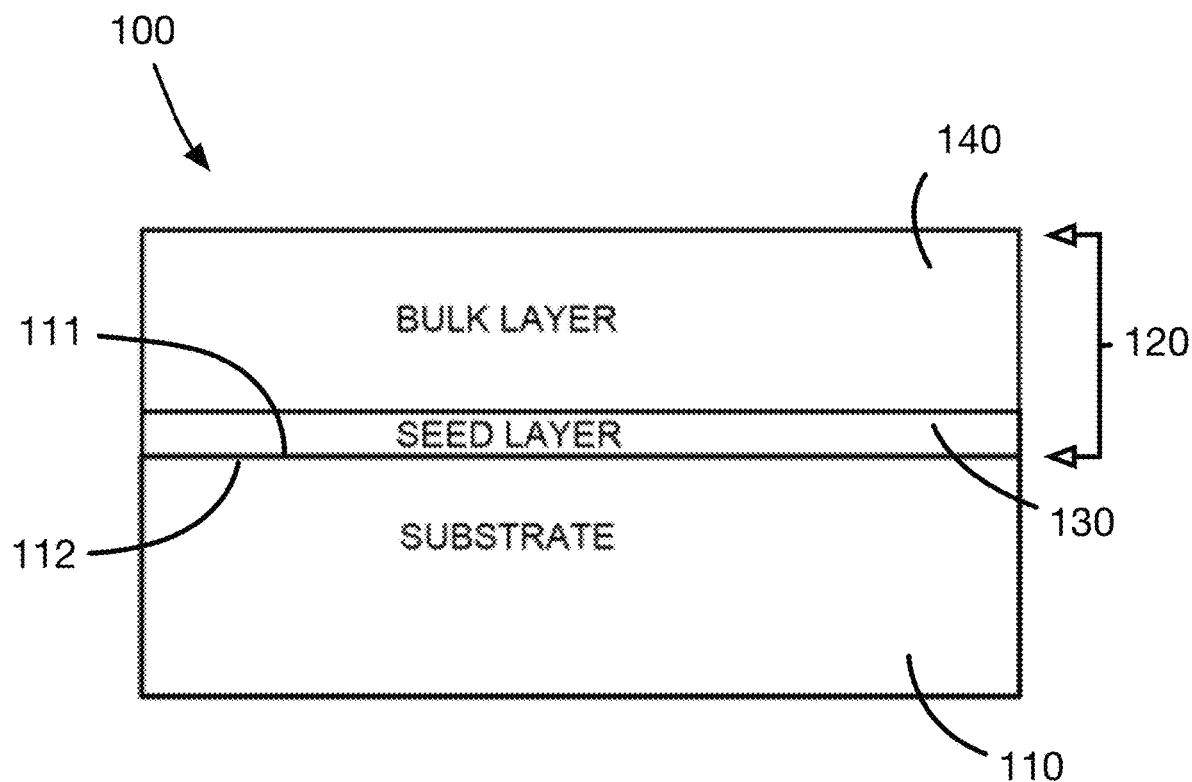
FIG. 1 shows a simplified view of the structure of the antimicrobial substrate in the present disclosure.

For simplicity and clarity of illustration, where considered appropriate, reference numerals may be repeated among the figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Referring to FIG. 1, the present disclosure relates, in a first aspect, to an antimicrobial material 100 including a base substrate 110. The base substrate 110 has a surface 111 that includes a base substrate material that includes at least one organic compound that has at least one functional group. In an embodiment, the base substrate material 112 is selected from a group of materials consisting of a fabric, a textile, a foam, and a paper. In other embodiments, the base substrate 110 may be a plant, or the skin or a human or an animal.

The base substrate 110 may be made entirely from one or more of the base substrate materials listed above. Alternatively, the base substrate 110 may include other materials which may also be organic or which may not be, and which may include a functional group, or which may not.

In an embodiment, the base substrate material 112 is a fabric of nylon, polyester, or silk and the at least one functional group of the at least one organic compound of the base substrate material 112 is a carbonyl group on the structures of the nylon, polyester, or silk.

In an alternative embodiment, the base substrate material 112 is a fabric and the at least one organic compound of the base substrate material is one of a cotton, rayon, or lyocell. In this embodiment, the at least one functional group of the organic compound is a hydroxyl group on the cellulose molecules of the cotton, rayon or cellulose molecules.

As presented in FIG. 1, the antimicrobial material 100 includes an antimicrobial covering 120 of an antimicrobial metal, the covering 120 being chemically bonded to the base substrate material 112. Ions of an antimicrobial metal are in the antimicrobial covering 120 and are bonded directly to the at least one organic compound of the base substrate material 112 without the use of a polymer matrix, adhesive, binder, binding agent additive or other residue-leaving agent which assists or promotes the adhesion of metal particles. In an embodiment, the antimicrobial metal within the antimicrobial covering 120 of the material is a metal selected from the group consisting of copper, silver, and zinc.

The antimicrobial covering 120 including the antimicrobial metal is generally formed of a seed layer 130 that is chemically bonded to the at least one organic compound of the base substrate material 112, and a bulk metal layer 140 that is chemically bonded to the seed layer 130. Through the chemical bonding of the seed layer 130 to both the base substrate material 112 and the bulk metal layer 140, the seed layer 130 acts as an adhesion layer, connecting the bulk metal layer 140 of the antimicrobial metal to the base substrate 110 without the use of a polymer, adhesive, binder or binding agent, and is characterized by a direct metal-to-base substrate bond.

In the antimicrobial material as disclosed herein, the seed layer 130 has a chemical structure including an ion of the antimicrobial metal that is chemically bonded to the functional group of the organic compound of the base substrate material 112 via a coordinated covalent bond.

The seed layer 130 is formed via a solution of a metal coordinate complex of the antimicrobial metal having the formula $Me_x(X_nY_m)[Z]$. In this embodiment of the metal coordinate complex, Me is an ion of the antimicrobial metal, X and Y are neutral ligand exchange components and Z is an anionic ligand exchange component. In an additional embodiment, the metal coordinate complex of the antimicrobial metal has a formula of the form $Me_x(NH_n)_y$—Z, where "n" and "y" are subscripts in a range from 0-4.

In an embodiment, the coordinated covalent bond occurring between the metal coordinate complex and the functional group of the at least on organic compound forms due to a ligand exchange occurring on metal ion of the metal coordinate complex. For producing the ligand exchange reaction and bonding the metal coordinate complex to the fabric, the functional group of the at least one organic compound includes a ligand capable of forming a coordinated covalent bond with the ions of the antimicrobial metal.

During the ligand exchange reaction, at least one surface ligand from the metal coordinate complex is displaced by a better stabilizing ligand from the functional group of the molecules of the organic material (on the surface 112 of the substrate). To form the coordinate covalent bonds of the seed layer through ligand exchange, the complex resulting from the bonding of the metal coordinate complex to the functional group of the organic compound shall have a greater stability constant than that of the metal coordinate complex without the bonded functional group.

Figure 2:
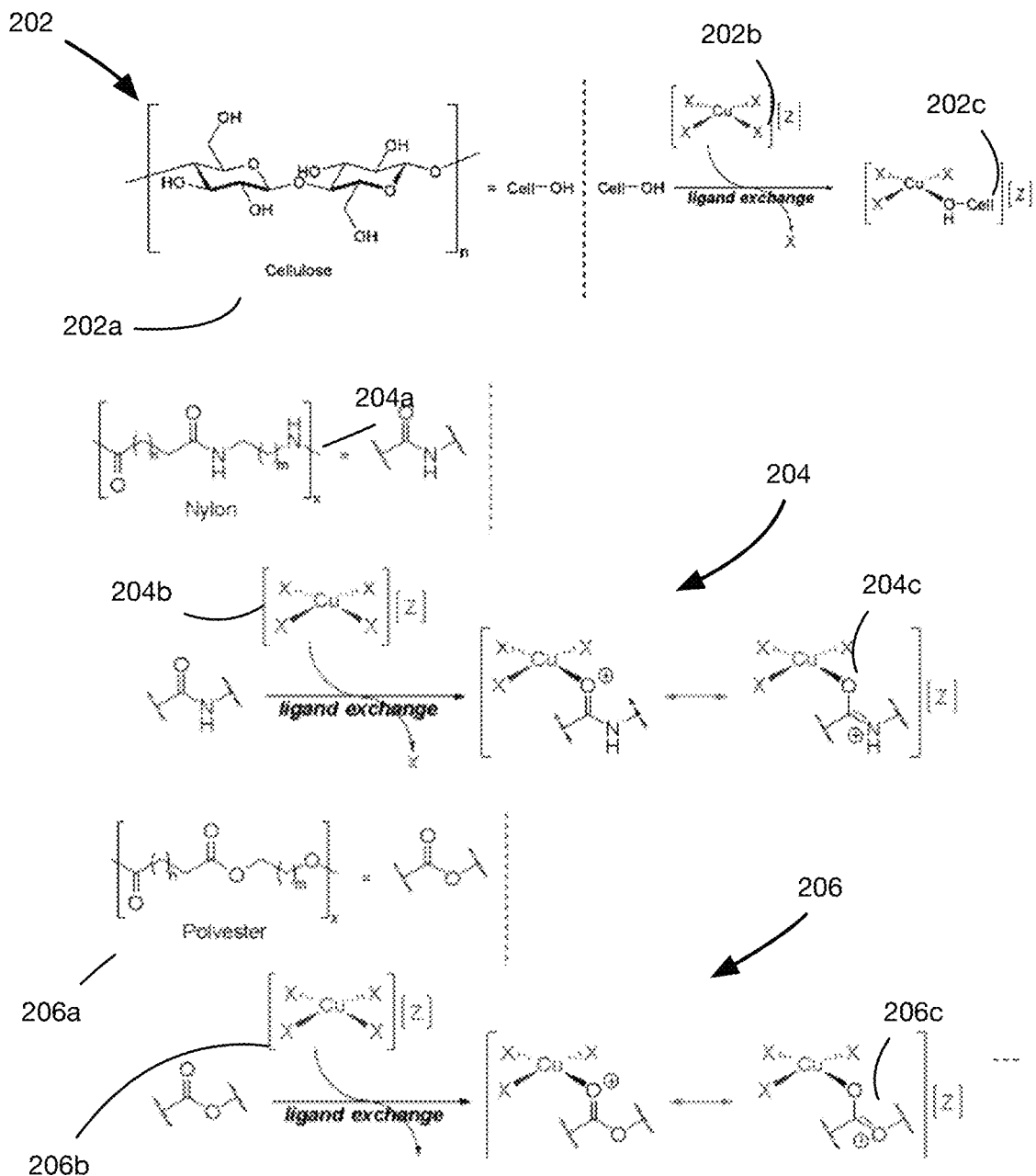
FIG. 2 shows a diagram of ligand exchange reactions which are illustrative of the ligand exchange reaction that occur during the formation of the seed layer of the antimicrobial material.

Referring to FIG. 2, three exemplary ligand exchange reactions are provided, each reaction being capable of forming the seed layer 130 of the antimicrobial material 100. A first embodiment of the reaction 202 provides a mechanism involving hydroxy-containing polymers, while the second and third embodiments of the reaction 204, 206 provide mechanisms involving carbonyl-containing polymers.

In the first embodiment of the ligand exchange reaction 202 shown in FIG. 2, the organic compound is a cellulose containing material 202a such as cotton, rayon, and lyocell. In this embodiment, the hydroxy (—OH) groups on the cellulose molecules of the cellulose containing material 202a are the stabilizing ligands. The hydroxy groups coordinate with the metal coordinate complex 202b (of the form $[Me(X)_n(Y)_m]Z$) and replace an existing ligand on the complex, resulting in a structure 202c where the metal complex is directly bonded to polymer chain. In the first embodiment of the reaction 202 shown in FIG. 2, the metal complex 202b is a copper complex, and the copper complex coordinates with the (—OH) ligand on polymer chain, resulting in a direct coordinate covalent bonding of the complex to polymer chain to form a cellulose-Cu complex. In this embodiment, the copper in the bonded complex exists in an oxidated form (i.e., Cu(I)/Cu(II)).

In the second and third embodiments of the ligand exchange reaction 204, 206 shown in FIG. 2, the organic material is a material such as nylon 204a or polyester 206a. In these embodiments, the carbonyl groups on the molecules of these materials function as the stabilizing ligand in the ligand exchange. The carbonyl groups bond via oxygen-coordination to the metal complex 204b, 206b. In the specific embodiment shown in FIG. 2, the metal complexes are copper complexes, and the copper complexes coordinates with the carbonyl ligands on polymer chain, resulting in structures 204c, 206c where the metal complex is directly bonded to polymer chain via a coordinated covalent bond.

The bulk metal layer 140 of the antimicrobial material 100 provides a source of a stable form of the antimicrobial metal for antimicrobial action. The bulk metal layer 140 preferably has a structure with a low water-solubility so as to be durable during washing of the antimicrobial material 100.

In an embodiment, the bulk metal layer 140 is a continuous film, chemically bonded to the seed layer 130 on the base substrate 120. In this embodiment, the bulk metal layer 140 is a layer of an antimicrobial metal oxide or an antimicrobial metal hydroxide. The bulk metal layer 140 has a chemical structure including at least one molecule of the antimicrobial metal oxide or metal hydroxide that is bonded to an ion of the antimicrobial metal in the seed layer 130 via a metal-oxide ionic bond.

The ions of the antimicrobial metal that exist as part of the metal oxide or the metal hydroxide of the bulk metal layer 140 are stable ions of the antimicrobial metal. For example, in the embodiments where the antimicrobial metal is copper, the metal ions in the bulk metal layer 140 may take any form of copper including Cu (0), Cu(1), Cu(2), Cu(3), Cu(4) or Cu(5).

Exemplary forms of antimicrobial metal oxide or antimicrobial metal hydroxide include copper (I) oxide, copper (II) oxide, silver oxide or copper hydroxide.

In an embodiment, the metal-oxide ionic bond occurring between the metal oxide/hydroxide molecules in the bulk metal layer 140 and an ion of the antimicrobial metal in the seed layer 130 is formed due to a decomposition of the weak ligands of the metal coordinate complex.

In an embodiment, at least one layer of the metal coordinate complex is provided on top of the seed layer 130. By exposing the metal coordinate complexes in this layer and the seed layer to heat or oxygen-containing, reactive molecules, a reaction will be generated whereby the metal coordinate complex forms metal-oxide or metal-hydroxide structures. This reaction will be driven by the decomposition of the weaker ligand bonds of the complex into stronger metal-oxide ionic bonds.

From the decomposition of the metal coordinate complexes, the bulk metal layer 140 will form as the metal-oxide or metal-hydroxide structures bond to one another to form a matrix of the bulk metal layer 140. As the bulk metal layer 140 forms, the bulk layer 140 also becomes chemically bonded to the seed layer 130. Metal-oxide ionic bonds form between the metal ions of the antimicrobial metal in the seed layer and the atoms in the bulk layer 140. Again, this reaction is driven by the decomposition of the weak ligand bonds on the metal ions in the seed layer.

In an embodiment, the final form of the molecular structures in the bulk metal layer 140 may be altered through at least one post-processing step. In addition, the stable ions which exist in the bulk metal layer 140 can also be altered based on the various post-processing steps.

In an embodiment, due to the at least one post processing step, the bulk metal layer 140 is a layer of an elemental metal of the antimicrobial metal. In this embodiment, the chemical structure of the bulk metal layer 140 includes an elemental form of the antimicrobial metal bonded to an ion of the antimicrobial metal in the seed layer 130.

In an alternative embodiment, due to the at least one post processing step, the bulk metal layer 140 is a layer of a metal hydroxide of the antimicrobial metal, where this antimicrobial metal hydroxide is a different metal hydroxide to a metal hydroxide which may initially form in the structure of the bulk metal layer 140.

In at least some embodiments, suitable ranges of the components of the antimicrobial material 100 can be defined through experimentation and analysis of the resulting products. Referring to Examples 9 and 10, suitable ranges of the component elements can be characterized through analysis of linear relationships of the components, generated via experimentation with samples of the antimicrobial material 100.

In an embodiment, the antimicrobial material 100 includes the base substrate 110 and the antimicrobial covering 120 where a ratio of the atomic weight % of the antimicrobial metal in the antimicrobial covering 120 to the atomic weight % of carbon in the antimicrobial material 100 is in a range from $3.726 \times 10^{-6}$ to 403.429, and a concentration of the antimicrobial metal in the antimicrobial material 100 is in a range from 0.0010078 mg/g to 54.598 mg/g.

In an embodiment where the antimicrobial metal is copper, a ratio of the atomic weight % of copper in the antimicrobial covering 120 to the atomic weight % of carbon in the antimicrobial material 100 is in a range from 1.404947 to 25.53372, and the concentration of copper in the antimicrobial material 100 is in a range from 0.31982 mg/g to 18.54129 mg/g.

In an embodiment where the antimicrobial metal is silver, a ratio of the atomic weight % of silver in the antimicrobial covering 120 to the atomic weight % of carbon in the antimicrobial material 100 is in a range from 0.18452 to 9.2073, and the concentration of silver in the antimicrobial material 100 is in a range from 0.19593 mg/g to 1.95424 mg/g.

Figure 3A:
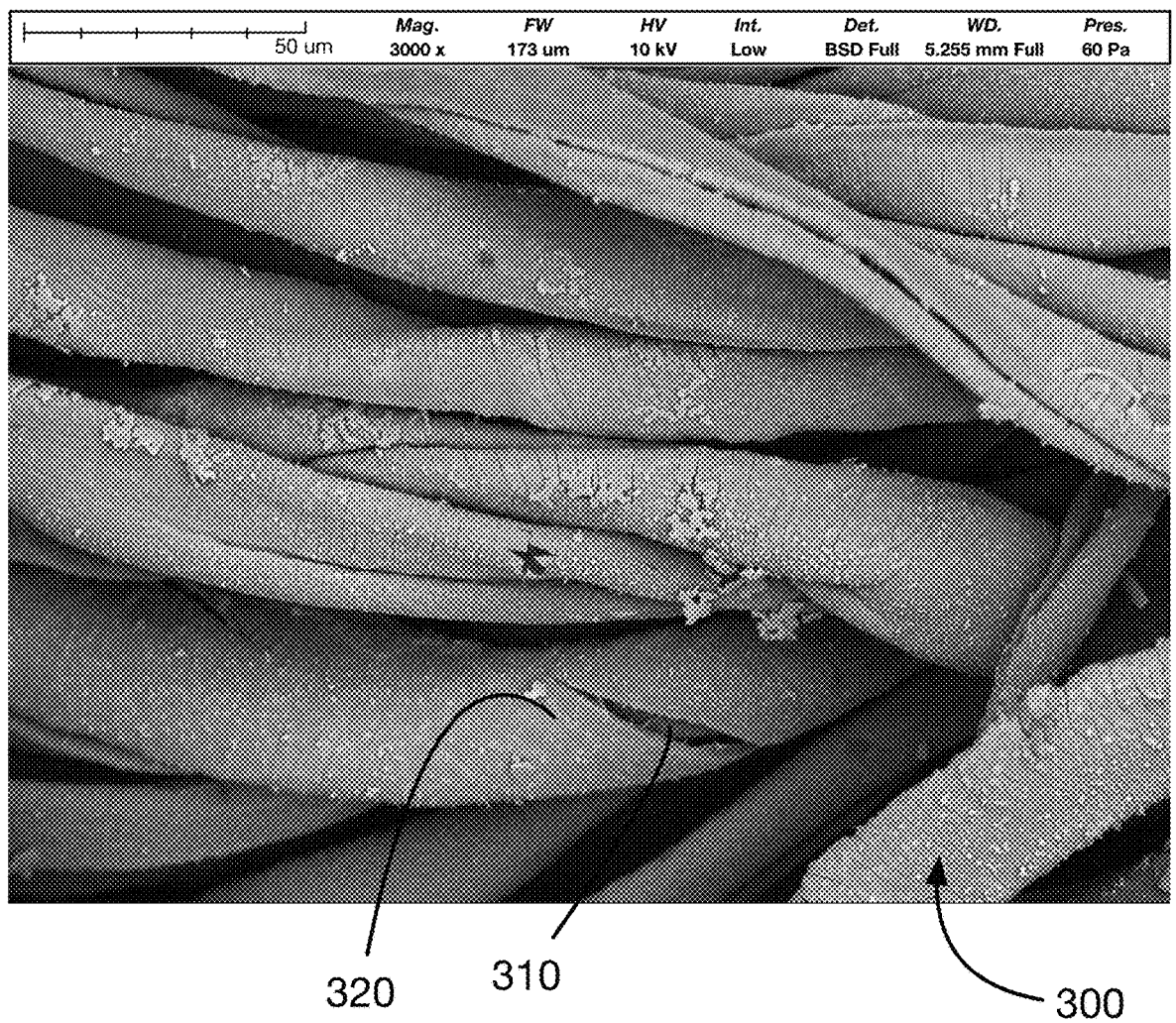
FIG. 3A shows a captured image of an embodiment of the antimicrobial material undergoing an x-ray computed tomography scan.
Figure 3B:
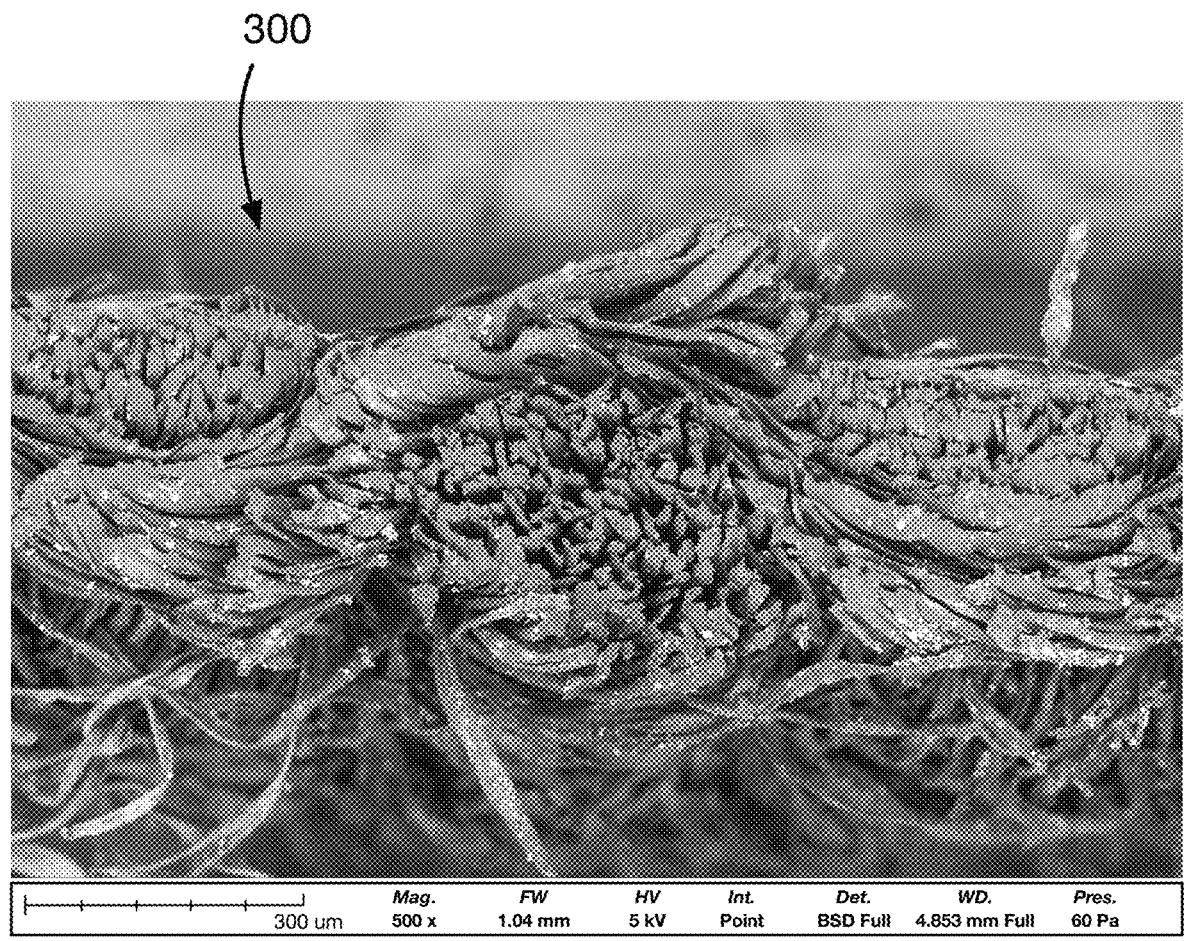
FIG. 3B shows another captured image of a cross-section of the antimicrobial material undergoing an x-ray computed tomography scan.

Referring to FIGS. 3A and 3B, an embodiment of antimicrobial material is shown, where the material 300 has been subjected to x-ray computer tomography analysis. In this embodiment, the base substrate material of the base substrate is a cotton fabric. The seed and bulk layer of the antimicrobial covering 320 are formed of a copper oxide framework and are bonded directly to the molecules of the cotton fibers. The antimicrobial covering 320 of the antimicrobial metal form a coating which surround and bonds to the micro-fibers 310 that makeup the cotton fabric of the base substrate material. Of note in the microstructure of the antimicrobial material 300 is the absence of any matrix between the fibers. If the copper molecules were bonded to the cotton fibers using a plasticizer or similar bonding agent, a framework or matrix of this plasticizer would exist between the fibers of the cotton fabric.

Figure 9A:
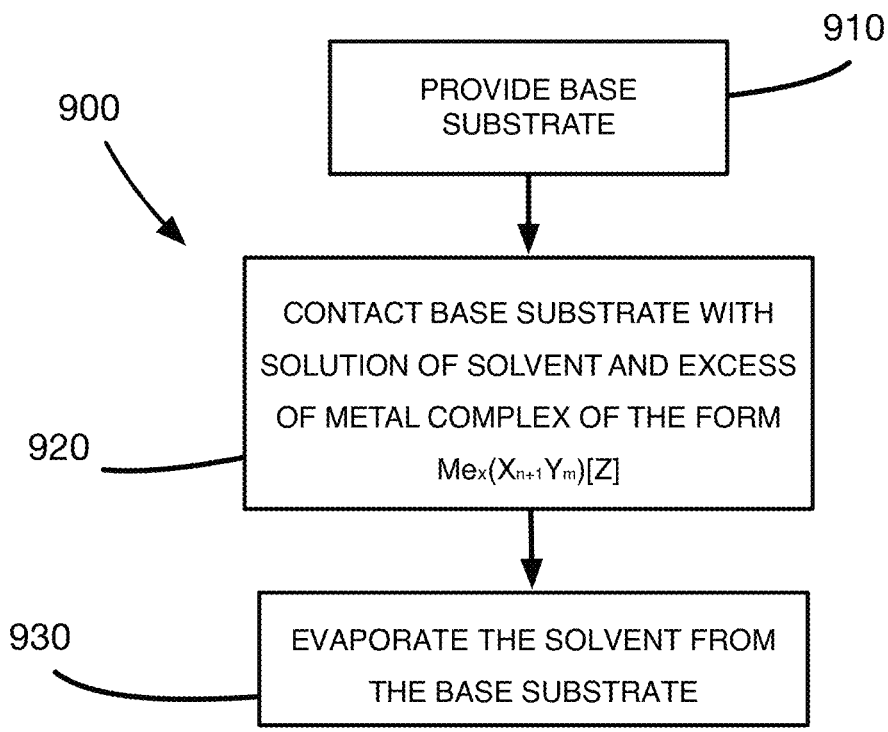
FIG. 9A shows a flow chart of an embodiment of the method for producing the antimicrobial material, as disclosed herein.

Referring to FIG. 9A, the present disclosure relates, in an additional aspect, to a method 900 for forming the antimicrobial material 100. The method 900 includes a first step 910 in which a base substrate 110 is provided. As noted previously, the base substrate 110 has a surface 112 including a base substrate material 112 selected from a group of materials consisting of a fabric, a textile, a foam, a yarn or a paper. In an embodiment, the base substrate material includes at least one organic compound that has at least one functional group.

In at least some embodiments, the steps of the method 900 take place in a liquid or gaseous atmosphere of water, or heated water (e.g., steam and boiling water), an aqueous solvent, a non-aqueous solvent, an air or oxygen containing environments at ambient conditions, or a nitrogen, argon or forming gas-containing environment.

In at least some embodiments the steps of the method 900 take place at a temperature in a range from 0 to 300 degrees Celsius. In an additional embodiment the steps of the method disclosed herein take place at a temperature at, or near, room temperature (e.g., 15-35 degrees Celsius).

The method 900 of forming the antimicrobial material 100 further includes a step 920 of contacting the base substrate 110 with a solution including a solvent and an excess of an initial metal complex that is a metal coordinate complex, where the initial metal complex has the form $Me_x(X_{n+1}Y_m)[Z]$ and wherein Me is an ion of an antimicrobial material, X and Y are neutral ligand exchange components and Z is an anionic ligand exchange component. The concentration of the initial metal complex of the form $Me_x(X_{n+1}Y_m)[Z]$ in the solution is sufficiently low to ensure reaction and bonding of most of the metal present in the solution onto the organic material of the base substrate 110, while at the same time ensuring that the amount of metal present in the final product of the antimicrobial material 100 is sufficiently high to ensure antimicrobial activity.

In an embodiment, the step 920 of contacting the base substrate 120 with the solution of the metal complex occurs for a period of from 1 to 60 minutes, or from 2 to 20 minutes, preferably, however, for a period of from 2 to 10 minutes, or from 4 to 6 minutes.

The application of the solution of the initial metal complex may be by any suitable means and will depend on the particular base substrate 110 and the particular solution involved. For example, the base substrate 110 may be immersed in a reservoir of the solution of the initial metal complex. In some alternative embodiments, the solution of the initial metal complex may be applied onto the base substrate 110 as fine droplets, such as in an aerosol spray or mist, generated by a misting apparatus.

In the embodiments where the base substrate 110 is immersed in the solution of the initial metal complex, the method 900 can additionally include a step of mixing or agitating the solution during the immersion process to promote a uniform distribution of ions of the antimicrobial metal throughout the base substrate material 112 of the base substrate 110.

The method step 920 of contacting the base substrate 110 with the solution of the initial metal complex generates a ligand exchange reaction between the base substrate and the initial metal complex in the solution for forming the seed layer 130 of the antimicrobial material 100. This ligand exchange reaction involves two phases: a) removing one of the neutral ligand exchange components X from the initial metal complex to form a final metal complex of the form $Me_x(X_nY_m)[Z]$, and b) bonding the final metal coordinate complex to the functional group of the at least one organic compound of the base substrate material via a coordinated covalent bond so as to form a seed layer.

The method of forming the antimicrobial material 900 further includes the step 930 of evaporating the solvent of the solution of the initial metal complex from the base substrate 110. In an embodiment where the base substrate 110 is immersed in solution, this step 930 will first include a step of removing the base substrate 110 from the solution, where an amount of solution of the initial metal complex will remain on the base substrate 110 after removal.

The step 930 of evaporating the solvent from the base substrate 110 drives a decomposition reaction of the ligand exchange components X and Y from both the initial metal complex of the form $Me_x(X_nY_m)[Z]$ in the seed layer and the final metal complex of the form $Me_x(X_{n+1}Y_m)[Z]$ in the solution. In this step, the decomposition reaction forms the bulk metal layer 140 of a metal oxide or metal hydroxide of the antimicrobial metal, wherein the chemical structure of the bulk metal layer 140 includes at least one molecule of the metal oxide or the metal hydroxide of the antimicrobial metal bonded to the ion of the antimicrobial metal in the seed layer via a metal-oxide ionic bond. In an additional embodiment, the structure of the bulk metal layer includes at least one additional molecule of the metal oxide or the metal hydroxide of the antimicrobial metal, the at least one additional molecule being bonded to the metal oxide or metal hydroxide molecule that is ionically bonded to the metal ion of the seed layer.

In at least some embodiments, the step 930 of evaporating the solvent of the solution of the initial metal complex from the base substrate 110 occurs at a temperature of between 10 and 120 degrees Celsius.

In at least some embodiments, the step 930 of evaporating the solvent from the base substrate 110 is accomplished by leaving the substrate 110 at room temperature for sufficient time to evaporate the solvent. In an alternative embodiment, the evaporating of the solvent from the base substrate 110 is accelerated with additional heat, airflow, ultraviolet energy, infrared energy or microwave energy.

In an exemplary embodiment, the at least one organic material of the base substrate 110 includes a cotton fabric, and the organic compound is cellulose within the cotton fabric. In the same embodiment, the solution of the solvent and initial metal complex is a copper solution, where the initial metal complex is of the form $[Cu(X)_n(Y)_m]Z$, where the neutral ligand exchange components X and Y are one of $NH_3$, $H_2O$ or $Et_3N$, where the subscripts n and m=are values in a range from 0 to 4, and where the anionic ligand component Z is one of $SO_4^{2-}$, $O^{2-}$, $HO^-$ or $O_2^{2-}$. In an additional form of this exemplary embodiment, the ratio of $Cu(X)_n(Y)_m]$ to Z in the solution is either 1:1 or 2:1.

When the base substrate 110 is submerged or brought into contact with the solution, a reaction between the organic compound of the base substrate 110 and the initial metal complex in the solution occurs. In the present example, the initial metal complex is a copper complex $[Cu(X)_{n+1}(Y)_m]Z$, which becomes chemically bonded to functional groups on the polymer chains of the cellulose making up the cotton fabric. The resulting bonded complex has the form $[Cu(X)_n(Y)_m]Z$.

Figure 9B:
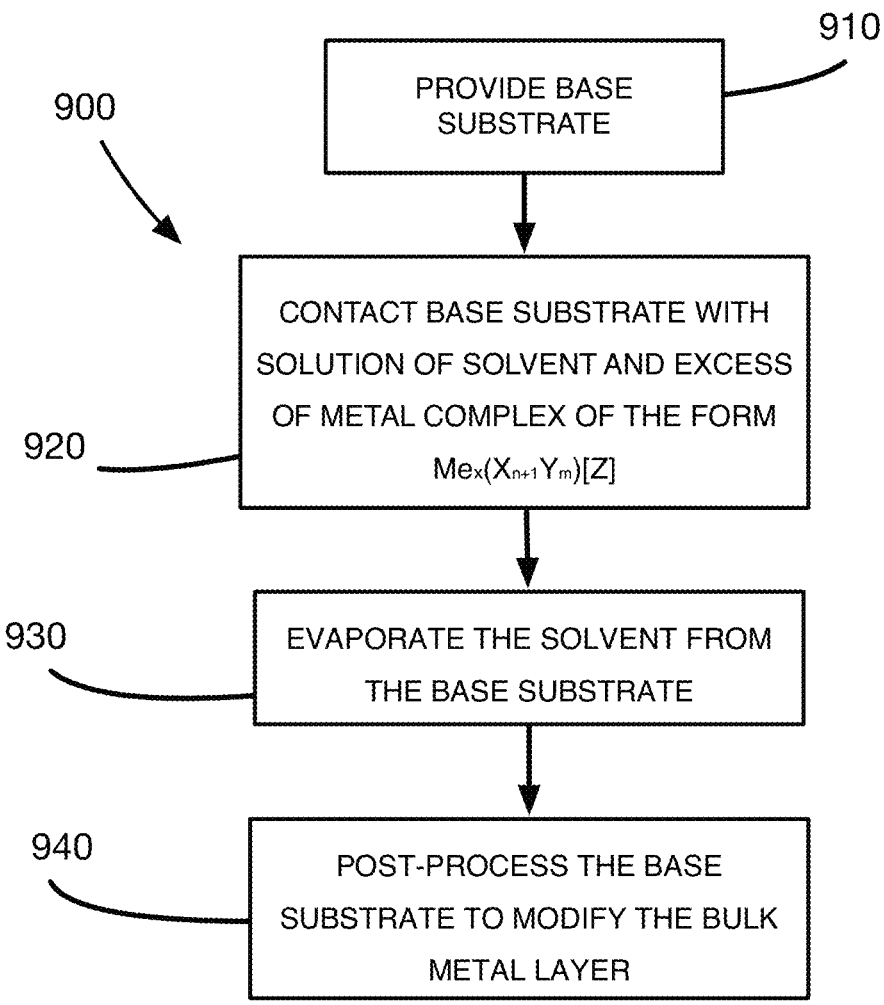
FIG. 9B shows a flow chart of an embodiment of the method for producing the antimicrobial material including a post processing step.

Referring to FIG. 9B, the method 900 of forming an antimicrobial material 100 as disclosed herein may optionally include at least one post-processing step 940 for modifying the bulk metal layer 140 of the antimicrobial covering, the at least one post processing step 940 occurring after the step 930 of evaporating the solvent from the base substrate.

In an embodiment, the at least one post processing step 940 includes the step of exposing the substrate 110 to room temperature air to achieve a modification of the chemical structure of the bulk metal layer 140. In this embodiment, the resulting chemical structure of the bulk metal layer 140 can include a metal hydroxide.

In an alternative embodiment, the at least one post processing step 940 includes exposing the substrate 110 to air heated to an elevated temperature. In this embodiment, the resulting chemical structure of the bulk metal layer 140 can include a metal hydroxide or an elemental metal, depending on the temperature to which the air is heated. For example, in an embodiment where the final metal complex on the base substrate 110 is Ag(NH3)—Z and the base substrate 110 is exposed to air at a temperature above 300 degrees Celsius, the final structure of the bulk metal layer 140 will include Ag (0) metallic silver.

In an additional embodiment, the at least one post processing step 940 includes the step of applying water at an elevated temperature to the substrate 110 to achieve a modification of the chemical structure of the bulk metal layer 140. In this embodiment, the resulting chemical structure of the bulk metal layer 140 can include a metal oxide. This embodiment may specifically include placing the base substrate 110 in boiling water to achieve the modification of the bulk metal layer 140.

In an alternative embodiment, the at least one post processing step 940 includes the step of steaming the substrate 110 to achieve a modification of the chemical structure of the bulk metal layer 140.

In an alternative embodiment, the at least one post processing step 940 includes the step of applying a forming gas the substrate 110 to achieve a modification of the chemical structure of the bulk metal layer 140.

In an alternative embodiment, the at least one post processing step 940 includes the step of performing a peroxidative reaction on the base substrate 110 to achieve a modification of the chemical structure of the bulk metal layer 140.

EXAMPLES

Example 1

Ten samples (1-10) are prepared using a section of 100% cotton fabric. The samples are soaked in a copper solution of a pre-determined concentration, having the form of $[Cu(X)_n(Y)_m]$—Z, where (X, Y=$NH_3$, $H_2O$, $Et_3N$, en, etc. . . . ; n, m=0-4; Z=$SO_4^{2-}$, $O^{2-}$, $HO^-$, $O_2^{2-}$. Varying amounts of copper are present in the chemical solutions into which the samples are submerged.

The samples are then removed from the solution and allowed to try at room temperature and are then dried again at an elevated temperature of above 60 degrees Celsius.

The samples are then tested for antimicrobial efficacy vs. *E. Coli* for 1-hr with >50% colony reduction (i.e. kill-rate) being predictive of >99% kill rate after 24 hrs. Referring to Table 1 provided below, sample 1 is shown to not reduce enough colonies in comparison to the control (un-treated) fabric and is deemed "- -".

The samples are tested for feel by hand to determine if the process for treating the fabric with the copper solution has changed the feel (before vs. after). The samples are then further washed and tested for metal presence and antimicrobial efficacy after 10 washes as a good/bad criteria for wash durability, as it is found that performance after 10 washes is predictive of performance after 25 or 50 washes (industry standards).

The actual and predicted results for all ten fabric samples are provided in Table 1 below.

TABLE 1

Test results of the antimicrobial composition of samples 1-10.

Substrate = 100% cotton fabric, Metal selected = Copper
Microbe tested = *E. Coli*

| Sample | (X) Ln[Cu conc. (mg/g)] | (Y) Ln [Mean Cu:C Atomic %] | Antimicrobial Efficacy | Hand Feel | Stain Uniform | Wash Durability |
|---|---|---|---|---|---|---|
| 1 | −8.89 | −5.01 | − − | + | + | − − |
| 2 | −6.90 | −3.65 | ○ | + | + | ○ |
| 3 | −4.91 | −2.29 | ○ | + | + | ○ |
| 4 | −1.14 | 0.34 | + | + | + | + |
| 5 | 0.45 | 1.34 | + | + | + | + |
| 6 | 1.51 | 1.89 | + | + | + | + |
| 7 | 1.91 | 2.51 | + | + | + | + |
| 8 | 2.46 | 2.80 | + | + | + | + |
| 9 | 3.83 | 3.68 | + + | ○ | − − | + |
| 10 | 4.42 | 4.09 | + + | ○ | − − | + |

Figure 4A:
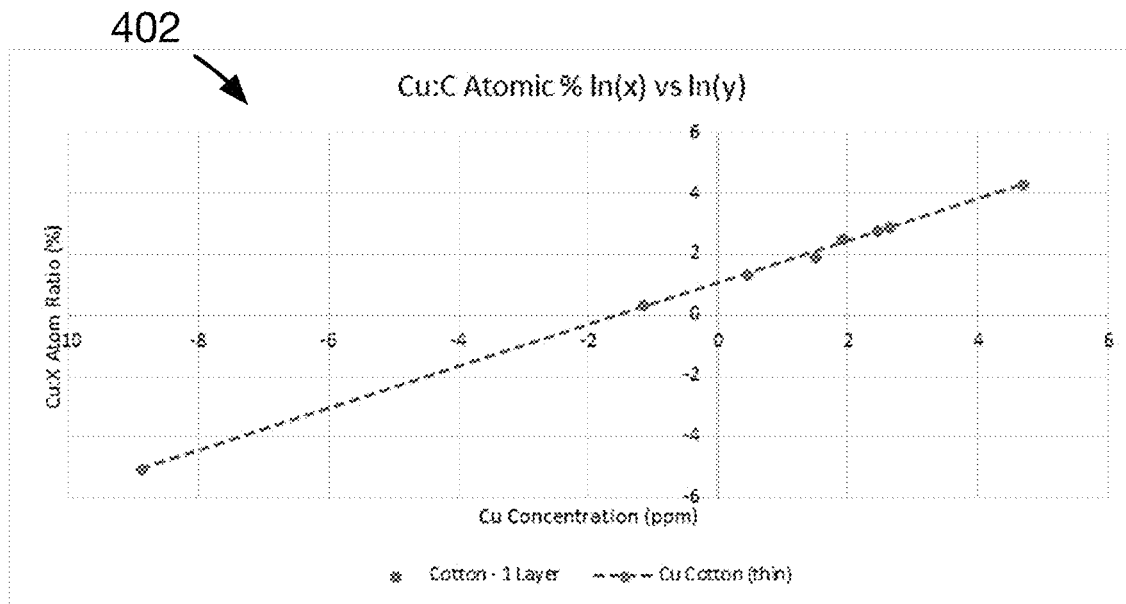
FIG. 4A shows a plot of the line-of-best-fit for the data presented in samples 1-10 of an Example 1 of a material made in accordance with the present disclosure.

The data in Table 1 is analyzed and double logarithmic regression is used to determine the linear relationship for samples 1-10, shown in FIG. 4A. It is found that samples 1-10 follow a linear relationship of the form y=mX+B, where Y=Ln (Cu:C atomic wt %) as measured by Energy Dispersive X-ray spectroscopy (EDX), X=ln(Cu concentration) in mg/gram measured by liquid extraction and fabric weight, m=0.683 and B=1.0636.

Using "+" values in Table 1 as a pass criterion, the optimal range for the copper-cotton fabrics of the present example is an X value between −1.14 and 2.46.

Example 2

Ten samples (11-20) are prepared using a section of two-layer cotton fabric. The samples are soaked in a copper solution of a pre-determined concentration, having the form of $[Cu(X)_n(Y)_m]$—Z, where (X, Y=$NH_3$, $H_2O$, $Et_3N$, en, etc . . . ; n, m=0-4; Z=$SO_4^{2-}$, $O^{2-}$, $HO^-$, $O_2^{2-}$. Varying amounts of copper are present in the chemical solutions into which the samples are submerged.

The samples are then removed from the solution and allowed to try at room temperature and are then dried again at an elevated temperature of above 60 degrees Celsius.

The steps of the post-soaking, test methodology presented in Example 1 are repeated for the ten samples (11-20) of Example 2.

The actual and predicted results for all ten fabric samples are provided in Table 2 below.

TABLE 2

Test results of the antimicrobial composition of samples 11-20.

Substrate = two-layer cotton fabric, Metal selected = Copper
Microbe tested = *E. Coli*

| Sample | (X) Ln[Cu conc. (mg/g)] | (Y) Ln [Mean Cu:C Atomic %] | Antimicrobial Efficacy | Hand Feel | Stain Uniform | Wash Durability |
|---|---|---|---|---|---|---|
| 11 | −2.68 | −5.05 | − − | + | + | − − |
| 12 | −1.63 | −3.33 | ○ | + | + | ○ |
| 13 | −0.59 | −1.60 | ○ | + | + | ○ |
| 14 | 0.63 | 0.06 | + | + | + | + |
| 15 | 1.02 | 1.47 | + | + | + | + |
| 16 | 1.73 | 2.11 | + | + | + | + |
| 17 | 1.89 | 2.66 | + | + | + | + |
| 18 | 2.45 | 3.24 | + | + | + | + |
| 19 | 4.02 | 5.98 | + + | ○ | ○ | + |
| 20 | 4.33 | 6.50 | + + | ○ | − − | + |

Figure 4B:
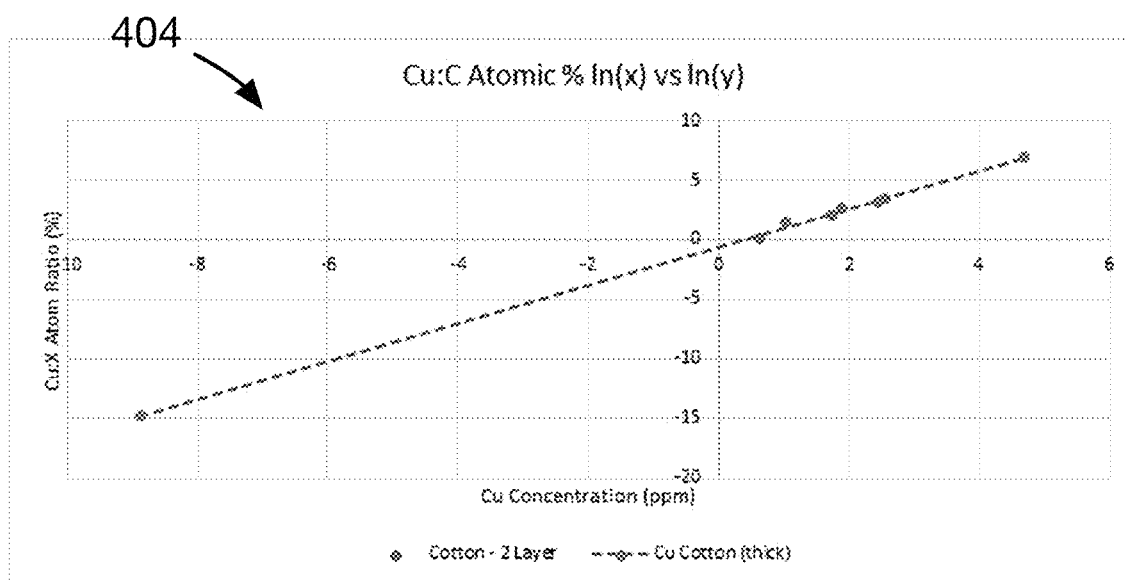
FIG. 4B shows a plot of the line-of-best-fit for the data presented in samples 11-20 of an Example 2 of a material made in accordance with the present disclosure.

The data in Table 2 is analyzed and double logarithmic regression is used to determine the linear relationship for samples 11-20, shown in FIG. 4B. It is found that samples 11-20 follow a linear relationship of the form y=mX+B, where Y=Ln (Cu:C atomic wt %) as measured by Energy Dispersive X-ray spectroscopy (EDX), X=ln(Cu concentration) in mg/gram measured by liquid extraction and fabric weight, m=1.65 and B=−0.64.

Using a "- -" values in Table 2 test result as fail criteria, the application dependent usable range is an X value between −1.63 to 4.02. Using "+" values in Table 2 as a pass criterion, the optimal range for the copper-cotton fabrics of the present example is an X value between 0.63 and 2.45.

Example 3

Ten samples (21-30) are prepared using a section of polyester fabric. The samples are soaked in a copper solution of a pre-determined concentration, having the form of $[Cu(X)_n(Y)_m]$—Z, where (X, Y=$NH_3$, $H_2O$, $Et_3N$, en, etc . . . ; n, m=0-4; Z=$SO_4^{2-}$, $O^{2-}$, $HO^-$, $O_2^{2-}$. Varying amounts of copper are present in the chemical solutions into which the samples are submerged.

The samples are then removed from the solution and allowed to try at room temperature and are then dried again at an elevated temperature of above 60 degrees Celsius.

The steps of the post-soaking, test methodology presented in Example 1 are repeated for the ten samples (21-30) of Example 3.

The actual and predicted results for all ten fabric samples are provided in Table 3 below.

TABLE 3

Test results of the antimicrobial composition of samples 21-30.

Substrate = polyester fabric, Metal selected = Copper
Microbe tested = *E. Coli*

| Sample | (X) Ln[Cu conc. (mg/g)] | (Y) Ln [Mean Cu:C Atomic %] | Antimicrobial Efficacy | Hand Feel | Stain Uniform | Wash Durability |
|---|---|---|---|---|---|---|
| 21 | −8.50 | −1.67 | − − | + | + | − − |
| 22 | −6.64 | −1.14 | ○ | + | + | ○ |
| 23 | −4.78 | −0.61 | ○ | + | + | ○ |
| 24 | −0.92 | 0.33 | + | + | + | + |
| 25 | −0.21 | 0.90 | + | + | + | + |
| 26 | 1.00 | 1.05 | + | + | + | + |
| 27 | 1.92 | 1.19 | + | + | + | + |
| 28 | 2.12 | 1.40 | + | + | + | + |
| 29 | 3.41 | 1.73 | + + | ○ | ○ | + |
| 30 | 3.97 | 1.89 | + + | ○ | − − | + |

Figure 4C:
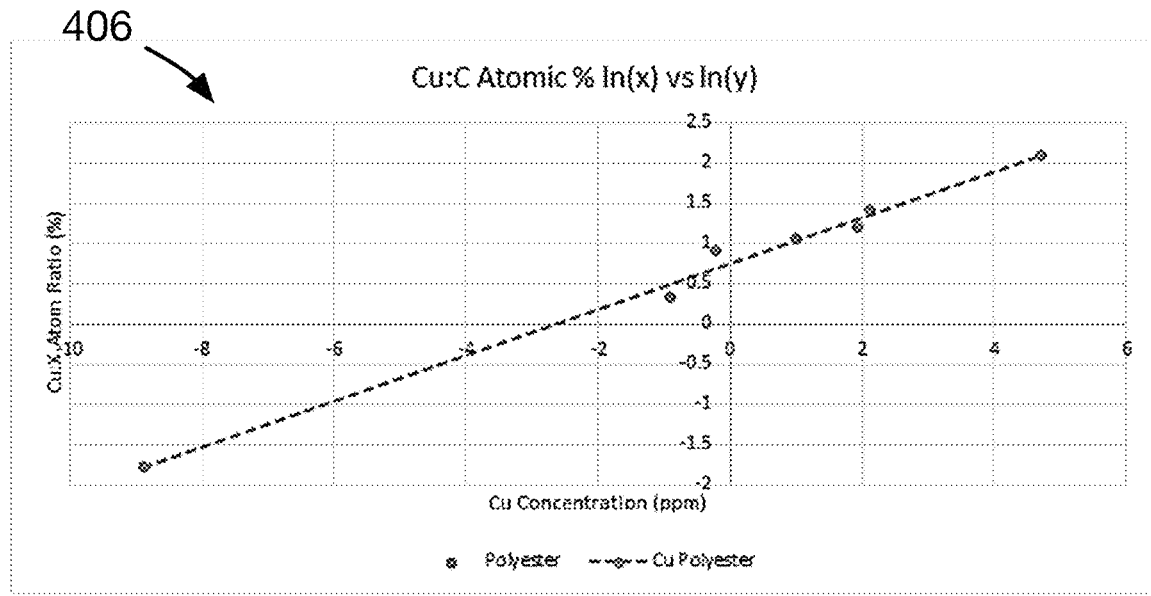
FIG. 4C shows a plot of the line-of-best-fit for the data presented in samples 21-30 of an Example 3 of a material made in accordance with the present disclosure.

The data in Table 3 is analyzed and double logarithmic regression is used to determine the linear relationship for samples 21-30, shown in FIG. 4C. It is found that samples 21-30 follow a linear relationship of the form y=mX+B, where Y=Ln (Cu:C atomic wt %) as measured by Energy Dispersive X-ray spectroscopy (EDX), X=ln(Cu concentration) in mg/gram measured by liquid extraction and fabric weight, m=0.29 and B=0.75.

Using a "- -" values in Table 3 test result as fail criteria, the application dependent usable range is an X value between −6.64 and 3.41. Using "+" values in Table 3 as a pass criterion, the optimal range for the copper-polyester fabrics of the present example is an X value between −0.92 and 2.12.

Example 4

Ten samples (31-40) are prepared using a section of 100% Nylon fabric. The samples are soaked in a copper solution of a pre-determined concentration, having the form of $[Cu(X)_n(Y)_m]$—Z, where (X, Y=$NH_3$, $H_2O$, $Et_3N$, en, etc . . . ; n, m=0-4; Z=$SO_4^{2-}$, $O^{2-}$, $HO^-$, $O_2^{2-}$. Varying amounts of copper are present in the chemical solutions into which the samples are submerged.

The immersed samples are then removed from the solution and allowed to try at room temperature and are then dried again at an elevated temperature of above 60 degrees Celsius.

The steps of the post-soaking, test methodology presented in Example 1 are repeated for the ten samples (31-40) of Example 4.

The actual and predicted results for all ten fabric samples are provided in Table 4 below.

TABLE 4

Test results of the antimicrobial composition of samples 31-40.

Substrate = 100% Nylon fabric, Metal selected = Copper
Microbe tested = *E. Coli*

| Sample | (X) Ln[Cu conc. (mg/g)] | (Y) Ln [Mean Cu:C Atomic %] | Antimicrobial Efficacy | Hand Feel | Stain Uniform | Wash Durability |
|---|---|---|---|---|---|---|
| 31 | −8.89 | −5.95 | − − | + | + | − − |
| 32 | −6.90 | −4.73 | ◯ | + | + | ◯ |
| 33 | −4.91 | −3.51 | ◯ | + | + | ◯ |
| 34 | −0.39 | −0.68 | + | + | + | + |
| 35 | 0.92 | 0.28 | + | + | + | + |
| 36 | 1.67 | 0.11 | + | + | + | + |
| 37 | 2.31 | 0.87 | + | + | + | + |
| 38 | 2.92 | 1.54 | + | + | + | + |
| 39 | 3.83 | 1.86 | + + | ◯ | ◯ | + |
| 40 | 4.42 | 2.23 | + + | ◯ | − − | + |

Figure 4D:
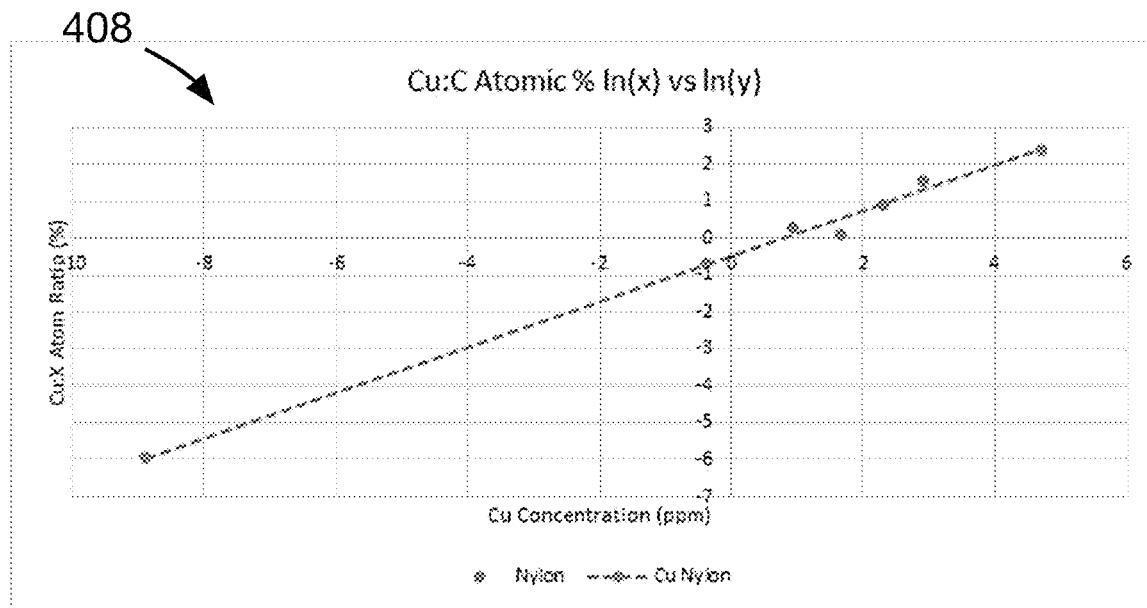
FIG. 4D shows a plot of the line-of-best-fit for the data presented in samples 31-40 of an Example 4 of a material made in accordance with the present disclosure.

The data in Table 4 is analyzed and double logarithmic regression is used to determine the linear relationship for samples 31-40, shown in FIG. 4D. It is found that samples 31-40 follow a linear relationship of the form y=mX+B, where Y=Ln (Cu:C atomic wt %) as measured by Energy Dispersive X-ray spectroscopy (EDX), X=ln(Cu concentration) in mg/gram measured by liquid extraction and fabric weight, m=0.61 and B=−0.49.

Using a "- -" values in Table 4 test result as fail criteria, the application dependent usable range is an X value between −6.9 and 3.8. Using "+" values in Table 4 as a pass criterion, the optimal range for the copper-nylon fabrics of the present example is an X value between −0.39 and 2.92.

Example 5

Seven samples (41-47) are prepared using a section of 100% cotton fabric. The samples are soaked in a silver solution of a pre-determined concentration, having the form of $[Ag(X)_n(Y)_m]$—Z, where (X, Y=$NH_3$, $H_2O$, $Et_3N$, en, etc . . . ; n, m=0-4; Z=$SO_4^{2-}$, $O^{2-}$, $HO^-$, $O_2^{2-}$. Varying amounts of copper are present in the chemical solutions into which the samples are submerged.

The immersed samples are then removed from the solution and allowed to try at room temperature and are then dried again at an elevated temperature of above 60 degrees Celsius.

The steps of the post-soaking, test methodology presented in Example 1 are repeated for the ten samples (41-47) of Example 5.

The actual and predicted results for all ten fabric samples are provided in Table 5 below.

TABLE 5

Test results of the antimicrobial composition of samples 41-47.

Substrate = white cotton fabric, Metal selected = Silver
Microbe tested = *E. Coli*

| Sample | (X) Ln[Ag conc. (mg/g)] | (Y) Ln [Mean Ag:C Atomic %] | Antimicrobial Efficacy | Hand Feel | Stain Uniform | Wash Durability |
|---|---|---|---|---|---|---|
| 41 | −2.33 | −2.39 | ◯ | + | + | ◯ |
| 42 | −1.63 | −1.69 | + | + | + | + |
| 43 | −0.94 | −1.29 | + | + | + | + |
| 44 | −0.03 | −0.08 | + | + | + | + |
| 45 | 0.67 | 2.22 | + | + | + | + |
| 46 | 2.56 | 4.22 | ++ | ◯ | ◯ | + |
| 47 | 3.00 | 4.85 | ++ | ◯ | − − | + |

Figure 4E:
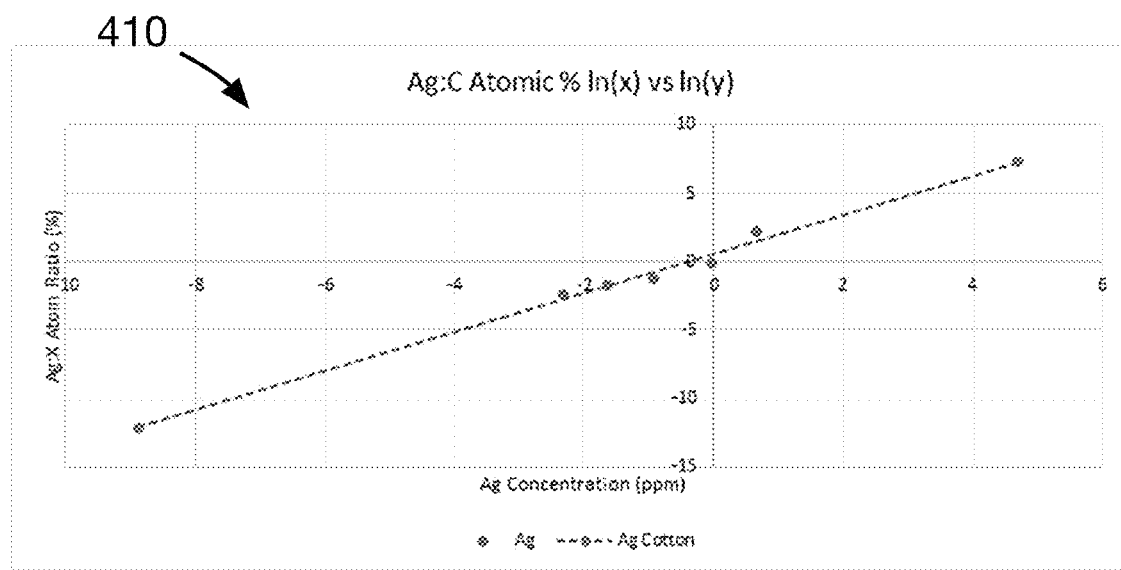
FIG. 4E shows a plot of the line-of-best-fit for the data presented in samples 41-47 of an Example 5 of a material made in accordance with the present disclosure.

The data in Table 5 is analyzed and double logarithmic regression is used to determine the linear relationship for samples 41-47, shown in FIG. 4E. It is found that samples 41-47 follow a linear relationship of the form y=mX+B, where Y=Ln (Ag:C atomic wt %) as measured by Energy Dispersive X-ray spectroscopy (EDX), X=ln(Ag concentration) in mg/gram measured by liquid extraction and fabric weight, m=1.43 and B=0.57.

Using a "- -" values in Table 5 test result as fail criteria, the application dependent usable range is an X value between −2.33 and 2.56. Using "+" values in Table 2 as a pass criterion, the optimal range for the silver-cotton fabrics of the present example is an X value between −1.63 and 0.67.

Example 6: Characterization (on Cotton)—Samples 1-10

Samples 1-10 are subjected to X-ray photoelectron Spectroscopy (XPS) analysis for characterization of the seed layer and bonding mechanism of the metal-to-fabric. The results of the XPS analysis are presented in FIG. 6. The C(1s) spectrum traces 630 show a result that is characteristic of cotton and provides information about the bonding mechanism. In the C(1s) spectrum traces 630, the trace for the non-infused (control) cotton fabric matches closely with the x-ray photoelectron spectrum of cellulose; this is expected as cotton fabric is composed almost entirely of cellulose. Observable in the control spectrum are important features at 286.4 eV (carbon atoms bonded to two oxygen atoms, O—C—O) and 284.7 eV (carbon atoms bonded to only one oxygen, C—O). These two signals are seen to decrease in relative intensity when comparing the trace of the copper-infused fabric to the trace of the non-infused fabric. These peaks are still present in the copper-infused trace as indicated by the broad shoulder in this region, however the relative decrease in signal intensity is indicative of a change in the chemical environments of the carbon atoms present in the fabric. This confirms the conclusion in which the Cu2+ ion is bonded to the hydroxy groups of the cellulosic cotton: bonding of the $Cu2_+$ ion to the hydroxy oxygen changes the chemical environment surrounding the hydroxy group, which in turn is felt by the carbon atoms also bonded to the same oxygen, hence the reduction in peak intensity. An additional peak at 283/284 eV is seen for both cotton fabrics which may be attributed to additional C—C bonds.

Figure 6:
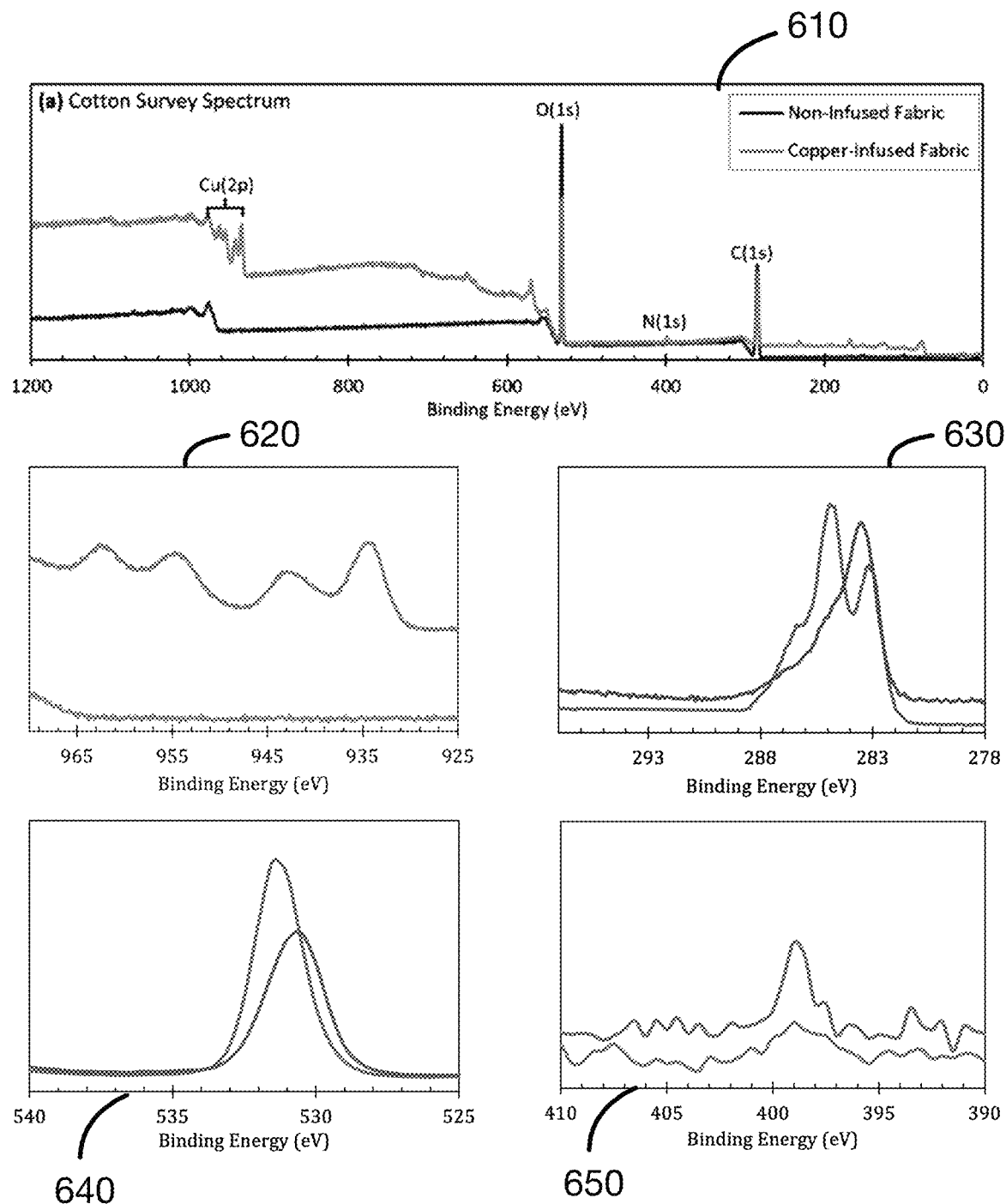
FIG. 6 shows several plots of the results of the X-ray photoelectron spectroscopy (XPS) analysis as described in an Example 6 of a material made in accordance with the present disclosure.

Samples 1-10 are subjected to further XPS analysis for further characterization of the bulk metal containing layer. Shown in FIG. 6 are the comparative x-ray photoelectron spectra of copper-infused and non-infused cotton fabrics. The main features of the survey spectrum are the peaks in the C(1s), N(1s), O(1s), and Cu(2p) traces (630, 640, 650, 620). Of specific note are the Cu(2p) and C(1s) traces (620, 630).

Examining the Cu(2p) traces 620, for the non-infused cotton fabric (control), the trace presented remains featureless, indicative of the absence of copper; this is to be expected given that the non-infused fabric was not subject to copper treatment. For the copper-infused cotton fabric, the main features of the Cu(2p) trace are the peaks at 934.2 and 954.6 eV ((Cu(2p3/2) and Cu(2p1/2) signals), and those at 942.6 and 962.4 eV (strong Cu2+ satellites), indicative of the presence of copper. Specifically, the presence of strong and well-defined peaks/satellites at 942.6 and 962.4 eV (as opposed to weak satellites in these regions) suggests the ionic nature of the bonded copper to be Cu2+ (cupric copper). Furthermore, the shape of the trace is comparable to that of copper(II) hydroxide, Cu(OH)2, and copper(II) oxide, CuO, providing evidence to the chemical identity of the copper within the bulk layer of the cotton fabric.

Example 7: Seed Layer Characterization (on Polyester)—Samples 21-30

Figure 7:
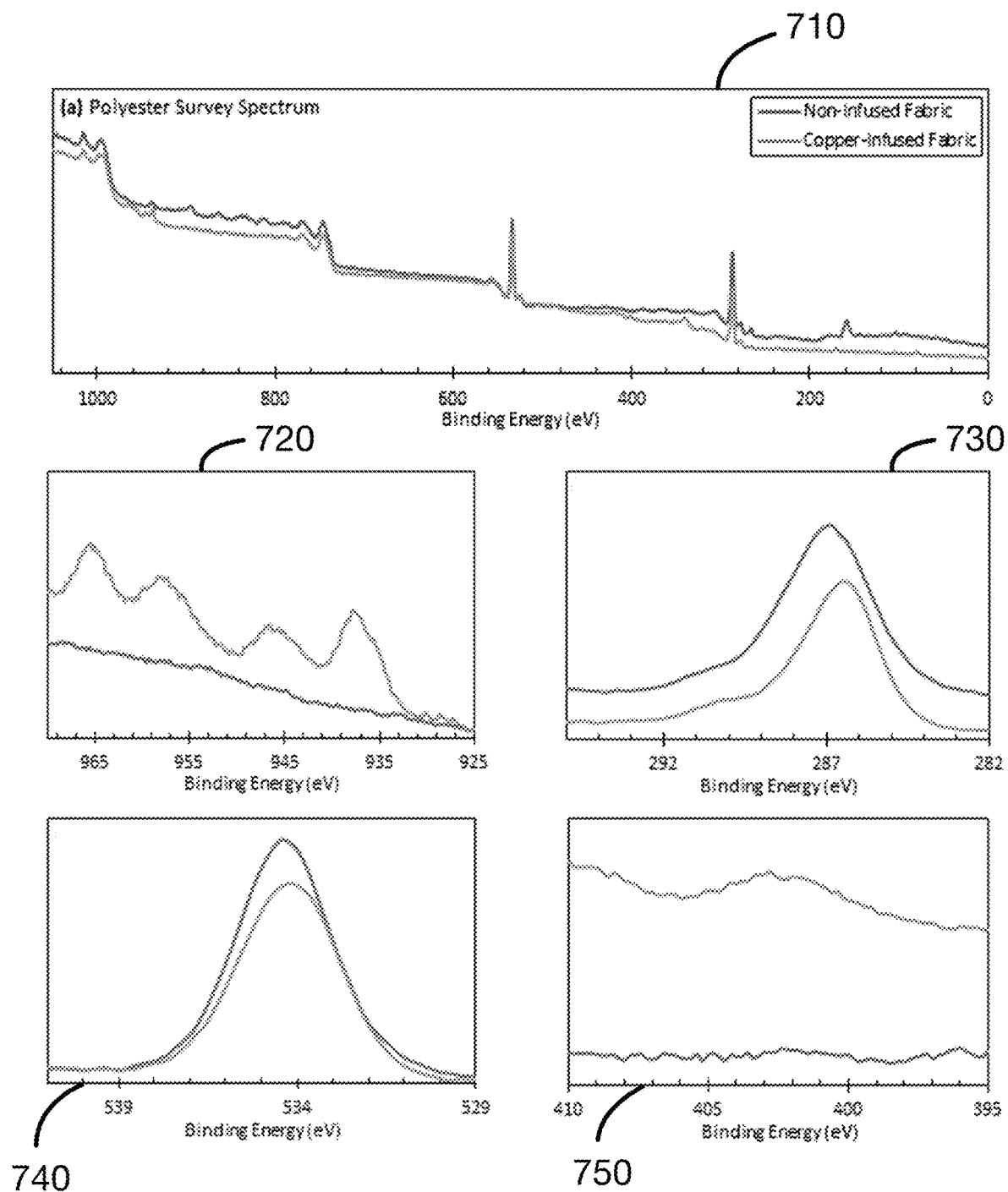
FIG. 7 shows several plots of the results of the X-ray photoelectron spectroscopy (XPS) analysis as described in an Example 7 of a material made in accordance with the present disclosure.

Samples 21-30 were subjected to XPS analysis for characterization of the seed layer and the mechanism of the metal-to-fabric bonding. The results of the analysis are provided in FIG. 7. The C(1s) and O(1s) (730, 740) traces are characteristic of a polyester. Specifically, as shown in the C(1s) trace, the carbonyl carbons (O—C═O and C═O) of a polyester are seen to make up the peak shoulder ranging from 291-288 eV, the ester carbons bonded to one single oxygen (C—O) are observed at 286.7 eV, while the aliphatic carbons (C—C) which make up the remainder of the polyester backbone are seen within the shoulder ranging from 285-284 eV. Likewise, in the O(1s) 740 trace, the signal is broader than a typical single peak, indicating the presence of multiple oxygen atoms in only slightly different chemical environments, characteristic of the two oxygen atoms making up the ester functionality. The decrease in signal intensity from the non-infused fabric to the copper-infused fabric indicates the carbonyl oxygens bond to the Cu2+ ion, as such a bond will affect the core electrons of the surrounding atoms.

Samples 21-30 are subjected to further XPS analysis for further characterization of the bulk metal containing layer, which is bonded to the seed layer, providing the source of metal ions for antimicrobial action. Shown in FIG. 2 are the comparative x-ray photoelectron spectra of copper-infused and non-infused polyester fabrics. The main features of the survey spectrum are once again, the peaks in the C(1s), N(1s), O(1s), and Cu(2p) traces (730, 740, 750, 720, respectively). Of specific note are the Cu(2p) and C(1s) traces (720, 730).

Examination of the Cu(2p) 720 trace for the non-infused polyester fabric (blue trace) is once again indicative of the absence of copper (as expected) due to the featureless and nearly linear nature of the curve. The copper-infused cotton fabric (orange trace) once again shows strong features indicating the presence of copper on the fabric and specifically representative of the Cu2+ species: peaks at 937.2 and 957.4 eV ((Cu(2p3/2) and Cu(2p1/2) signals), and peaks at 945.4 and 965.8 eV (strong Cu2+ satellites). As before, the presence of the strong and well-defined satellites at 945.4 and 965.8 eV are the features suggesting the ionic nature of the bonded copper to be Cu2+. Once again, the shape of the trace is comparable to that of copper(II) hydroxide, Cu(OH) 2, and copper(II) oxide, CuO, supporting the aforementioned evidence of the chemical identity of the copper on the cotton fabric. This correlates with color, solubility, EDX and FTIR data of bulk powders produced using the same process and starting chemicals.

Example 8: Seed Layer Characterization—Samples 33-39

Figure 8:
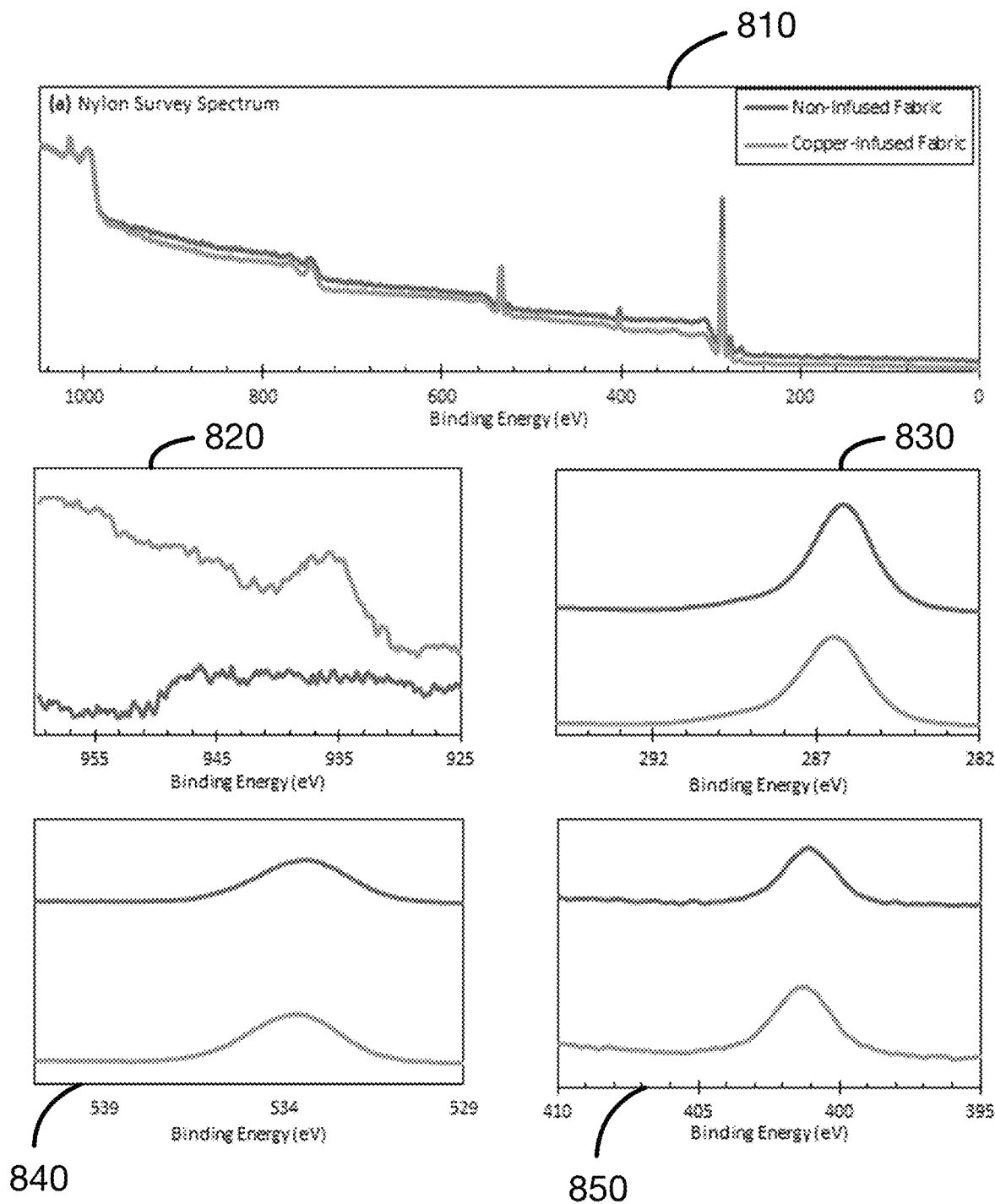
FIG. 8 shows several plots of the results of the X-ray photoelectron spectroscopy (XPS) analysis as described in an Example 8 of a material made in accordance with the present disclosure.

Samples 33-39 are subjected to XPS analysis for characterization of the seed layer and the mechanism of the metal-to-fabric bonding. The results are shown in FIG. 8. Examination of the Cu(2p) trace 820 shows a featureless baseline for the non-infused nylon fabric. As before, this indicates the absence of copper on the untreated fabric. The copper-infused cotton fabric in the Cu(2p) trace 820 shows evidence of the Cu(2p3/2) peak at 935.4 eV, although the increased intensity of the trace past 940 eV indicates that the other peaks characteristic of Cu2+ (i.e., the strong Cu2+ satellites and the 2p1/2 feature) are likely present.

The C(1s) trace 830 is characteristic of a polyamide such as nylon. Specifically, the carbons bonded to nitrogen (HN—C=O and HN—C) in the nylon fabric are seen to make up the peak shoulder ranging from 289-287 eV, a second carbonyl carbon signal (C=O) is seen to make up the peak at 286.0 eV alongside the aliphatic carbons (C—C). Comparative intensities between the two fabrics show lower intensities for the copper-infused nylon fabric. This result is consistent with observations for the cotton and polyester fabrics, confirming the carbonyl oxygen of the amide moiety participates in the bonding with the Cu2+ ion.

In all the infused samples in Examples 6-8, the metal-infused traces display changes in one of the chemical environments of the carbon atoms in the material or the signal intensity of the C(1s), O(1s) and (N1s) traces. These changes validate the principle that the metal ions of the antimicrobial metal are directly, chemically bonded to the functional group of the at least one organic compound of the base substrate material.

Example 9

This example demonstrates the calculation of a linear equation for defining the suitable ratios of elements in the antimicrobial metal.

A range of suitable ratios of the components of the AM material are defined through experimentation and analysis. A ratio of antimicrobial metal to carbon in the antimicrobial covering of the AM material is defined according to the formula: Y=mX+B, where Y=ln [(atomic wt % of metal in the treated fabric)/(atomic wt % of carbon in the treated fabric)] and X=ln (metal concentration in mg/gram)[measured by liquid extraction of digested substrate], where m=the slope of the linear equation and B=the Y-intercept of the linear equation.

Figure 5:
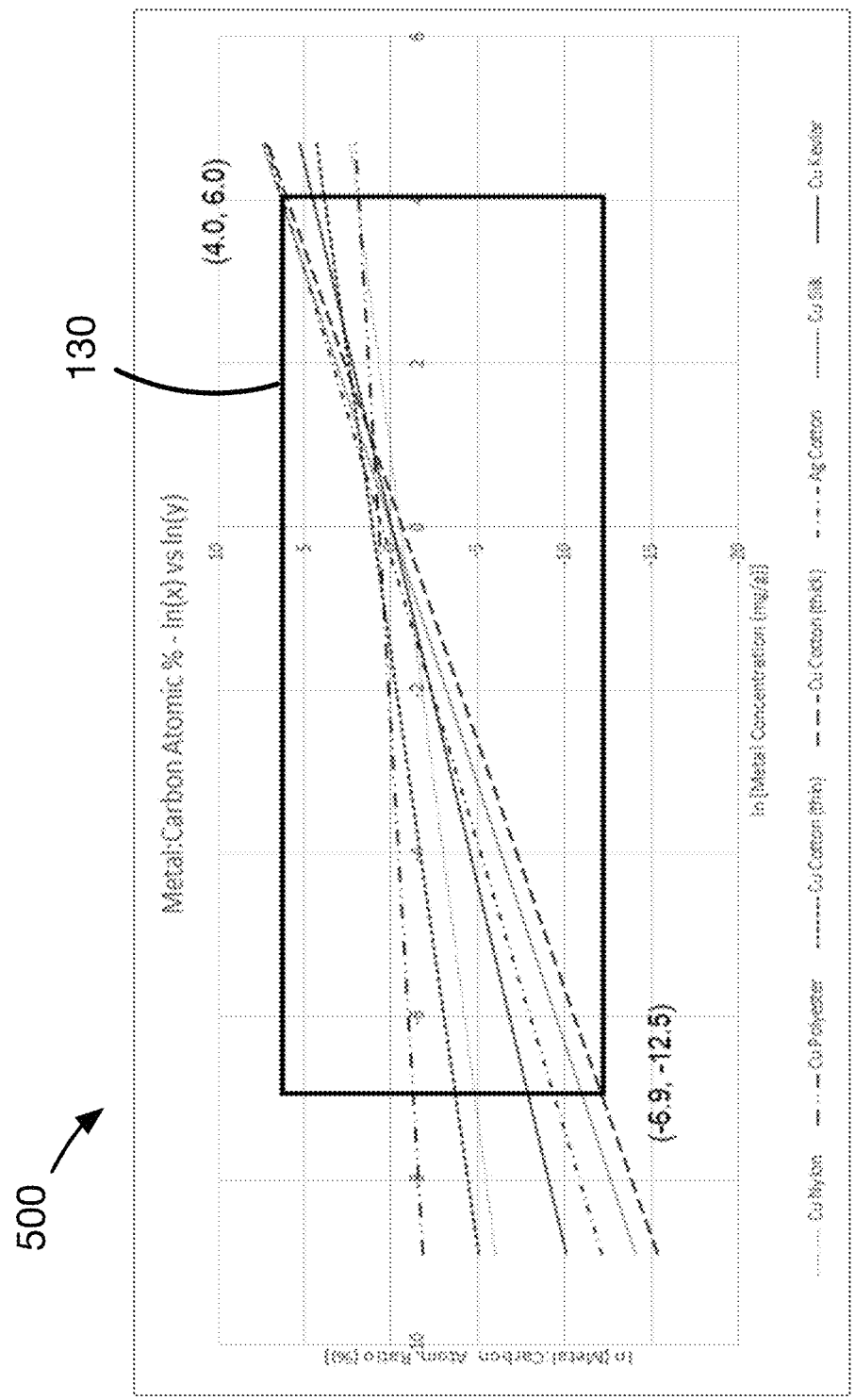
FIG. 5 shows a plot of the solution space for suitable compositions of the antimicrobial substrate.

Referring to FIG. 5, a plot of the linear relationships for samples of Examples 1-5 is provided. Through this plot of the linear relationships of the samples, an embodiment of the solution space defining a working range of the substrate for a variety of metals is determined. The working range is a range through which the substrate meets the pass/fail criteria of sufficient antimicrobial efficacy, good wash durability, good hand/feel and color/staining uniformity. In the embodiment provided in FIG. 5, the solution space is found to be bounded by a value of X in a range from −6.9 to 4.0 and a value of Y in a range from −12.5 to 6.0.

Example 10

This example demonstrates the application of the linear equation in Example 9 for defining the ratios of elements in the antimicrobial metal.

Using the calculated linear equation, the performance of a newly produced material can be predicted based on the data collected from previously tested materials. Samples 48-54 illustrate the linear algorithm being used to predict performance for materials by using the data from previous materials tested. The methodology uses the known atomic carbon ratio for untested materials to determine the slope, m, for the equation Y=mX+B, where Y=ln (metal:carbon atomic wt %) and X=ln (digested copper per original fabric weight in mg/gram).

In a non-limiting example where copper (Cu) is the antimicrobial metal. This example demonstrates how the predicted slope, (m), can be used in the equation Y=mX+B presented above.

The atomic carbon ratios are provided in Table 6 below.

TABLE 6

Predicted slopes for various fibers.
Substrate = white cotton fabric, Metal selected = Copper

| Example | Fiber type | Chemical formula | Atomic carbon ratio | ln[C] | m |
|---|---|---|---|---|---|
| 41 | Silk (Fibroin) | $C_{15}H_{13}O_7N_6$ | 0.365853659 | −1.0055 | 1.58053787 |
| 42 | Polyacrylonitrile | $C_3H_3N$ | 0.428571429 | −0.8473 | 1.35226888 |
| 43 | Polyethylene terephthalate | $C_{10}H_8O_4$ | 0.454545455 | −0.7885 | 1.26737999 |
| 44 | Kevlar | $C_{14}H_{10}O_2N_2$ | 0.5 | −0.6932 | 1.12987646 |
| 45 | Neoprene | $C_4H_5Cl$ | 0.4 | −0.9163 | 1.45180456 |
| 46 | Nitrile Rubber | $C_7H_9N$ | 0.411764706 | −0.8873 | 1.40998438 |
| 47 | PVC | $C_2H_3Cl$ | 0.333333333 | −1.0986 | 1.71483896 |

What is claimed is:

1. A metal-infused, antimicrobial material, comprising:
   a base substrate having a surface including a base substrate material selected from a group of materials consisting of a fabric, a textile, a foam, and a paper, the base substrate material including at least one organic compound that has a functional group;
   a seed layer being chemically bonded to the base substrate and having a chemical structure including an ion of an antimicrobial metal that is chemically bonded to the functional group of the organic compound of the base substrate material via a coordinated covalent bond; and
   a continuous bulk metal layer of a metal oxide or a metal hydroxide of the antimicrobial metal being chemically bonded to the seed layer and having a chemical structure including at least one molecule of the metal oxide or the metal hydroxide of the antimicrobial metal that is bonded to the ion of the antimicrobial metal in the seed layer via a metal-oxide ionic bond.

2. The metal-infused, antimicrobial material of claim 1, wherein the antimicrobial metal is a metal selected from the group consisting of copper, silver and zinc.

3. The metal-infused, antimicrobial material of claim 1, wherein the seed layer and the continuous bulk metal layer define an antimicrobial covering of antimicrobial material, and wherein a ratio of the atomic weight % of the antimicrobial metal in the antimicrobial covering of the antimicrobial material to the atomic weight % of carbon in the antimicrobial material is in a range from $3.726 \times 10^{-6}$ to 403.429, and wherein a concentration of the antimicrobial metal in the antimicrobial material is in a range from 0.0010078 mg/g to 54.598 mg/g.

4. The metal-infused, antimicrobial material of claim 3, wherein the antimicrobial metal is copper, and wherein the ratio of the atomic weight % of copper in the antimicrobial covering of the antimicrobial material to the atomic weight % of carbon in the antimicrobial material is in a range from 1.404947 to 25.53372, and the concentration of copper in the in the antimicrobial material is in a range from 0.319819 mg/g to 18.54129 mg/g.

5. The metal-infused, antimicrobial material of claim 3, wherein the antimicrobial metal is silver, and wherein a ratio of the atomic weight % of silver in the antimicrobial covering of the antimicrobial material to the atomic weight % of carbon in the antimicrobial material is in a range from 0.18452 to 9.2073, and the concentration of silver in the in the antimicrobial material is in a range from 0.19593 mg/g to 1.95424 mg/g.

6. The metal-infused, antimicrobial material of claim 1, wherein the base substrate material is a fabric of cotton, rayon, or lyocell, the at least one organic compound is cellulose, and the functional group of the at least one organic material is a hydroxy group of a molecule of cellulose.

7. The metal-infused, antimicrobial material of claim 1, wherein the base substrate material is a fabric of nylon, polyester, or silk and the functional group is a carbonyl group of the molecular structures of the nylon, polyester, or silk.

8. The metal-infused, antimicrobial material of claim 1, wherein the chemical structure is a metal complex of the form $Me_x(X_nY_m)[Z]$, wherein Me is an ion of an antimicrobial metal, X and Y are neutral ligand exchange components, Z is an anionic ligand component, x is 1, and n and m are both integer values in a range from 0 to 4.

9. The metal-infused, antimicrobial material of claim 8, wherein the form $Me_x(X_nY_m)[Z]$ is a metal complex of the form $[Me_x(X)_n(Y)_m]Z$, wherein X, Y is $NH_3$, $H_2O$, or $Et_3N$ and Z is $SO_4^{2-}$, $O^{2-}$, $HO^-$, or $O_2^{2-}$ and the antimicrobial metal is a metal selected from the group consisting of copper, silver and zinc.

10. The metal-infused, antimicrobial material of claim 9, wherein the antimicrobial metal is copper or silver.

11. A method for preparing a metal-infused, antimicrobial material, the method comprising:
   a) providing a base substrate having a surface including a base substrate material selected from a group of materials consisting of a fabric, a textile, a foam, and a paper, the base substrate material including at least one organic compound that has a functional group;
   b) contacting the base substrate with a solution including a solvent and an excess of an initial metal complex of the form $Me_x(X_{n+1}Y_m)[Z]$ to generate a ligand exchange reaction, wherein Me is an ion of an antimicrobial metal, X and Y are neutral ligand exchange components, Z is an anionic ligand component, x is 1, and n and m are both integer values in a range from 0 to 4, and wherein the ligand exchange reaction includes:
      i. removing one of the neutral ligand exchange components X from the initial metal complex to form a metal coordinate complex of the form $Me_x(X_nY_m)[Z]$, and
      ii. bonding the metal coordinate complex to the functional group of the at least one organic compound of the base substrate material via a coordinated covalent bond so as to form a seed layer; and
   c) evaporating the solvent to drive a decomposition reaction of the ligand exchange components X and Y from the metal coordinate complex of the form $Me_x(X_nY_m)[Z]$ in the seed layer and from the metal coordinate complex of the form $Me_x(X_{n+1}Y_m)[Z]$ in the solution, the decomposition reaction forming a continuous bulk metal layer of a metal oxide or metal hydroxide of the antimicrobial metal, the chemical structure of the continuous bulk metal layer including at least one molecule of the metal oxide or the metal hydroxide of the antimicrobial metal bonded to the ion of the antimicrobial metal in the seed layer via a metal-oxide ionic bond.

12. The method according to claim 11, wherein the antimicrobial metal is copper and the solution including a solvent and an excess of an initial metal complex is a solution of a solvent and copper complex of the form $[Cu(X)_n(Y)_m]Z$ having a molar ratio of $[Cu(X)_n(Y)_m]$ to Z that is 1:1 or 2:1.

13. The method according to claim 11, wherein the solution including a solvent and an excess of an initial metal complex is a solution of a solvent and metal complex of the form $[Me_x(X)_n(Y)_m]Z$, wherein X, Y is $NH_3$, $H_2O$, or $Et_3N$ and Z is $SO_4^{2-}$, $O^{2-}$, $HO^-$, or $O_2^{2-}$ and the antimicrobial metal is a metal selected from the group consisting of copper, silver and zinc.

14. The method according to claim 13, wherein the antimicrobial metal is copper or silver.

15. The method according to claim 11, wherein the solution including a solvent and an excess of an initial metal complex is a solution of a solvent and metal complex of the form $[Me_x(NH_n)_y]Z$, wherein y is an integer value in a range from 0 to 4 and the antimicrobial metal is a metal selected from the group consisting of copper, silver and zinc.

16. The method according to claim 15, wherein the solution including a solvent and an excess of an initial metal complex is a solution of a solvent and copper complex of the form $Cu(NH_n)_yZ$, wherein y is an integer value in a range from 0 to 4.

17. The method according to claim 11, wherein a concentration of the initial metal complex of the form $Me_x(X_{n+1}Y_m)[Z]$ in the solution is sufficiently low to ensure reaction and bonding of most of the metal present in the solution onto the base material of the base substrate, while at the same time ensuring that the amount of metal oxide or metal hydroxide present in the antimicrobial material is sufficiently high to ensure antimicrobial activity.

18. The method according to claim 11, wherein base substrate is immersed in the solution of the initial metal complex and the solution is mixed or agitated during the immersion to promote a uniform distribution of ions of the antimicrobial metal throughout the base substrate material of the base substrate.

19. The method according to claim 11, wherein step b) further includes adding an additional liquid containing an N—H chemical group to the solvent to adjust the pH of the composition to greater than 8.

20. The method according to claim 19, wherein the liquid containing the N—H chemical group is ammonium hydroxide, a primary organo-amine or alkyl-amine.

21. The method according to claim 11, wherein the steps of the method take place at a temperature of about 15° C. to about 35° C.

22. A metal-infused, antimicrobial material made by the method according to claim 11.

* * * * *